US012645979B2

(12) United States Patent
Rout et al.

(10) Patent No.: US 12,645,979 B2
(45) Date of Patent: Jun. 2, 2026

(54) COLUMN CLASSIFICATION MACHINE LEARNING MODELS

(71) Applicant: Optum Technology, Inc., Eden Prairie, MN (US)

(72) Inventors: Swapna Sourav Rout, Bangalore (IN); Sudeep Choudhary, Jharia (IN); Subhadip Maji, Bangalore (IN); Vineet Shukla, Bangalore (IN); Ravi Kumar Raju Gottumukkala, Bangalore (IN); John Markson, Maple Grove, MN (US)

(73) Assignee: Optum Technology, Inc., Eden Prairie, MN (US)

( * ) Notice: Subject to any disclaimer, the term of this patent is extended or adjusted under 35 U.S.C. 154(b) by 1050 days.

(21) Appl. No.: 17/147,144

(22) Filed: Jan. 12, 2021

(65) Prior Publication Data

US 2022/0222571 A1 Jul. 14, 2022

(51) Int. Cl.

| | |
|---|---|
| *G06N 20/00* | (2019.01) |
| *G06F 7/76* | (2006.01) |
| *G06F 17/16* | (2006.01) |
| *G06F 18/21* | (2023.01) |
| *G06F 18/211* | (2023.01) |
| *G06F 18/241* | (2023.01) |

(52) U.S. Cl.
CPC .............. *G06N 20/00* (2019.01); *G06F 7/76* (2013.01); *G06F 17/16* (2013.01); *G06F 18/211* (2023.01); *G06F 18/217* (2023.01); *G06F 18/241* (2023.01)

(58) Field of Classification Search
CPC .............. G06N 3/00; G06N 5/00; G06N 7/00; G06N 20/00; G06N 99/00
See application file for complete search history.

(56) References Cited

U.S. PATENT DOCUMENTS

| | | |
|---|---|---|
| 8,682,819 B2 | 3/2014 | Consul et al. |
| 10,192,069 B2 | 1/2019 | Nerurkar et al. |
| 10,423,803 B2 | 9/2019 | Scaiano et al. |
| | (Continued) | |

OTHER PUBLICATIONS

Hulsebos, M., Hu, K., Bakker, M., Zgraggen, E., Satyanarayan, A., Kraska, T., Demiralp, Ç., & Hidalgo, C. (2019). Sherlock: A Deep Learning Approach to Semantic Data Type Detection. In Proceedings of the 25th ACM SIGKDD International Conference on Knowledge Discovery & Data Mining (pp. 1500-1508). (Year: 2019).*

(Continued)

*Primary Examiner* — Kakali Chaki
*Assistant Examiner* — Johnathan R Germick
(74) *Attorney, Agent, or Firm* — Alston & Bird LLP

(57) ABSTRACT

There is a need for more effective and efficient performing classification-based predictive data analysis on named data collections. This need can be addressed by, for example, solutions for performing classification-based predictive data analysis on named data collections that utilize at least one of techniques for generating column classification machine learning models to perform column classification, techniques for generating column classification machine learning models to perform anomaly detection, techniques for utilizing trained column classification machine learning models to perform column classification, and techniques for utilizing trained column classification machine learning models to perform anomaly detection.

15 Claims, 17 Drawing Sheets

404

Generate a vectorized representation of the permutated sampled sequence
701

Process the vectorized representation to generate an inferred classification
702

Determine a measure of deviation based on the inferred classification and a ground-truth classification
703

Set parameters of the column classification machine learning model based on the measure of deviation
704

(56)                References Cited

U.S. PATENT DOCUMENTS

| 10,572,459 | B2 | 2/2020 | Simeonov |
| 2006/0074826 | A1 | 4/2006 | Heumann et al. |
| 2007/0255704 | A1 | 11/2007 | Baek et al. |
| 2013/0332194 | A1 | 12/2013 | D'Auria et al. |
| 2015/0161331 | A1 | 6/2015 | Oleynik |
| 2015/0242639 | A1 | 8/2015 | Galil et al. |
| 2017/0302679 | A1 | 10/2017 | Caramico |
| 2018/0232528 | A1 | 8/2018 | Williamson et al. |
| 2018/0285694 | A1 | 10/2018 | Kobayashi |
| 2018/0314573 | A1 | 11/2018 | Chang et al. |
| 2018/0366221 | A1 | 12/2018 | Crehore et al. |
| 2019/0303569 | A1 | 10/2019 | Cheng |
| 2020/0043579 | A1 | 2/2020 | McEwing |
| 2020/0066392 | A1 | 2/2020 | Bess et al. |
| 2020/0327416 | A1 | 10/2020 | Baker et al. |
| 2020/0410091 | A1 | 12/2020 | Kimon et al. |
| 2021/0103580 | A1 | 4/2021 | Schierz et al. |
| 2022/0012625 | A1 | 1/2022 | Ben-Itzhak et al. |

OTHER PUBLICATIONS

Sebastian Raschka. (2020). Model Evaluation, Model Selection, and Algorithm Selection in Machine Learning. (Year: 2020).*

Qinglong Wang, Wenbo Guo, Kaixuan Zhang, Alexander G. Ororbia II au2, Xinyu Xing, C. Lee Giles, & Xue Liu. (2017). Adversary Resistant Deep Neural Networks with an Application to Malware Detection. (Year: 2017).*

T. Li, N. Li, J. Zhang and I. Molloy, "Slicing: A New Approach for Privacy Preserving Data Publishing," in IEEE Transactions on Knowledge and Data Engineering, vol. 24, No. 3, pp. 561-574, Mar. 2012, doi: 10.1109/TKDE.2010.236. (Year: 2012).*

Doan, A., Domingos, P., & Halevy, A. (2001). Reconciling schemas of disparate data sources: a machine-learning approach. SIGMOD Rec., 30(2), 509-520 (Year: 2001).*

Shichao Zhang, Z. Qin, C. X. Ling and S. Sheng, ""Missing is useful": missing values in cost-sensitive decision trees," in IEEE Transactions on Knowledge and Data Engineering, vol. 17, No. 12, pp. 1689-1693, Dec. 2005, doi: 10.1109/TKDE.2005.188. (Year: 2005).*

A. Majeed and S. Lee, "Anonymization Techniques for Privacy Preserving Data Publishing: A Comprehensive Survey," in IEEE Access, vol. 9, pp. 8512-8545, 2020, doi: 10.1109/ACCESS.2020. 3045700 (Year: 2020).*

Ganesh, S.S., Arulmozhivarman, P. & Tatavarti, V.S.N.R. Prediction of PM2.5 using an ensemble of artificial neural networks and regression models. J Ambient Intell Human Comput (2018). https://doi.org/10.1007/s12652-018-0801-8 (Year: 2018).*

"Machine Learning: Study Data From Huazhong University of Science and Technology Provide New Insights Into Machine Learning (A Machine Learning Based Approach to Identify Protected Health Information in Chinese Clinical Text)", Journal of Robotics & Machine Learning, Jul. 23, 2018, (2 pages).

Borghesi, Andrea et al. "Anomaly Detection Using Autoencoders in High Performance Computing Systems," The Thirty-First AAAI Conference on Innovative Applications of Artificial Intelligence (IAAI-19), Jul. 17, 2019, vol. 33, No. 1, pp. 9428-9433).

Costa, Bruno Sielly Jales et al. "Fully Unsupervised Fault Detection and Identification Based on Recursive Density Estimation and Self-Evolving Cloud-Based Classifier," Neurocomputing, vol. 150, Part A, Feb. 20, 2015, (26 pages). DOI: 10.1016/j.neucom.2014. 05.086.

Hulsebos, Madelon et al. "Sherlock: A Deep Learning Approach to Semantic Data Type Detection," arXiv:1905.10688v1, May 25, 2019, (9 pages).

Umer, Shagufta et al. "Autonomous Mapping of HL7 RIM and Relational Database Schema," Information Systems Frontiers, Mar. 2012, vol. 14, No. 1, pp. 5-18, (ePublished: Jun. 3, 2011). DOI: 10.1007/s10796-011-9309-x.

Wang, Ruoyu et al. "Statistical Detection of Collective Data Fraud," arXiv:2001.00688v2, Nov. 18, 2020, (6 pages).

Winter, Jenifer Sunrise et al. "Governance of Artificial Intelligence and Personal Health Information," Digital Policy Regulation and Governance (DPRG), vol. 21, No. 3, (16 pages). DOI: 10.1108/DPRG-08-2018-0048.

Advisory Action (PTOL-303) Mailed on May 21, 2025 for U.S. Appl. No. 17/147,132, 2 page(s).

Non-Final Rejection Mailed on Jun. 18, 2024 for U.S. Appl. No. 17/147,132, 30 page(s).

Final Rejection Mailed on Feb. 13, 2025 for U.S. Appl. No. 17/147,132, 22 page(s).

* cited by examiner

External Computing Entities 102

Predictive Data Analysis Computing Entity 106

Storage Subsystem 108

Predictive Data Analysis System 101

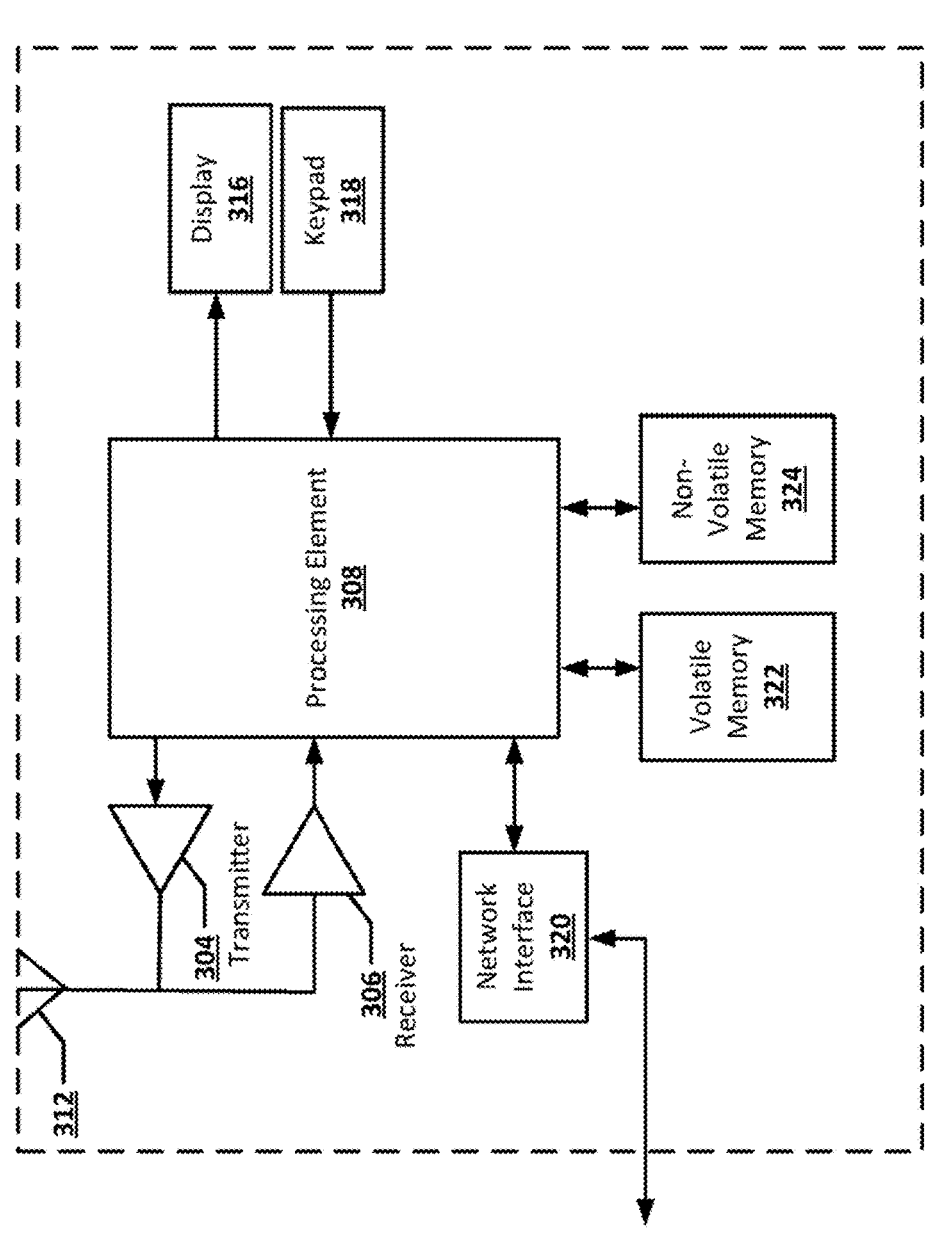
FIG. 3

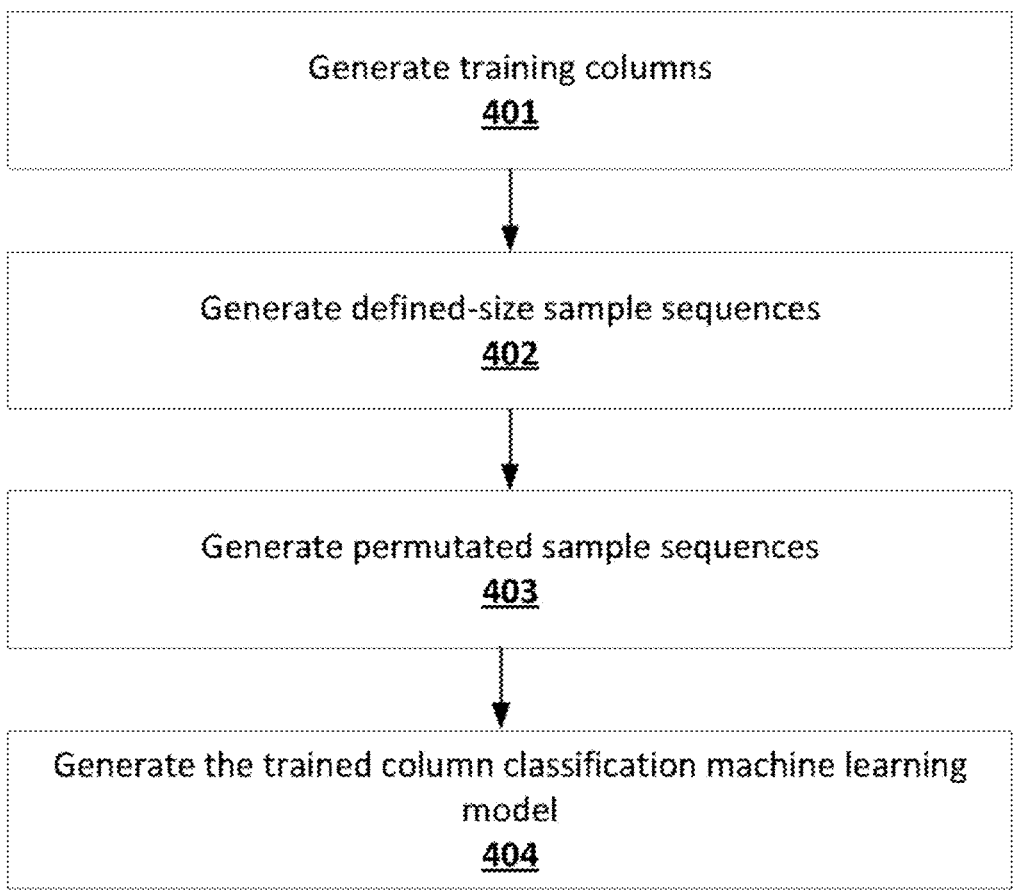
FIG. 4

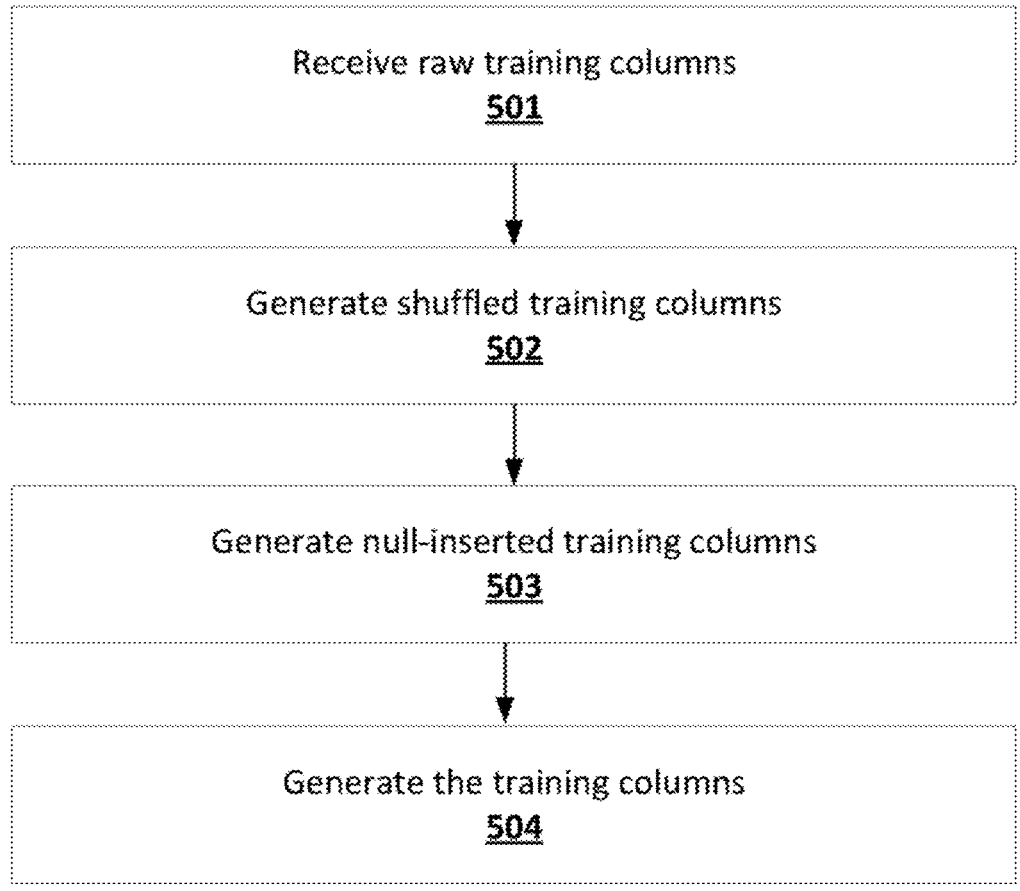
FIG. 5

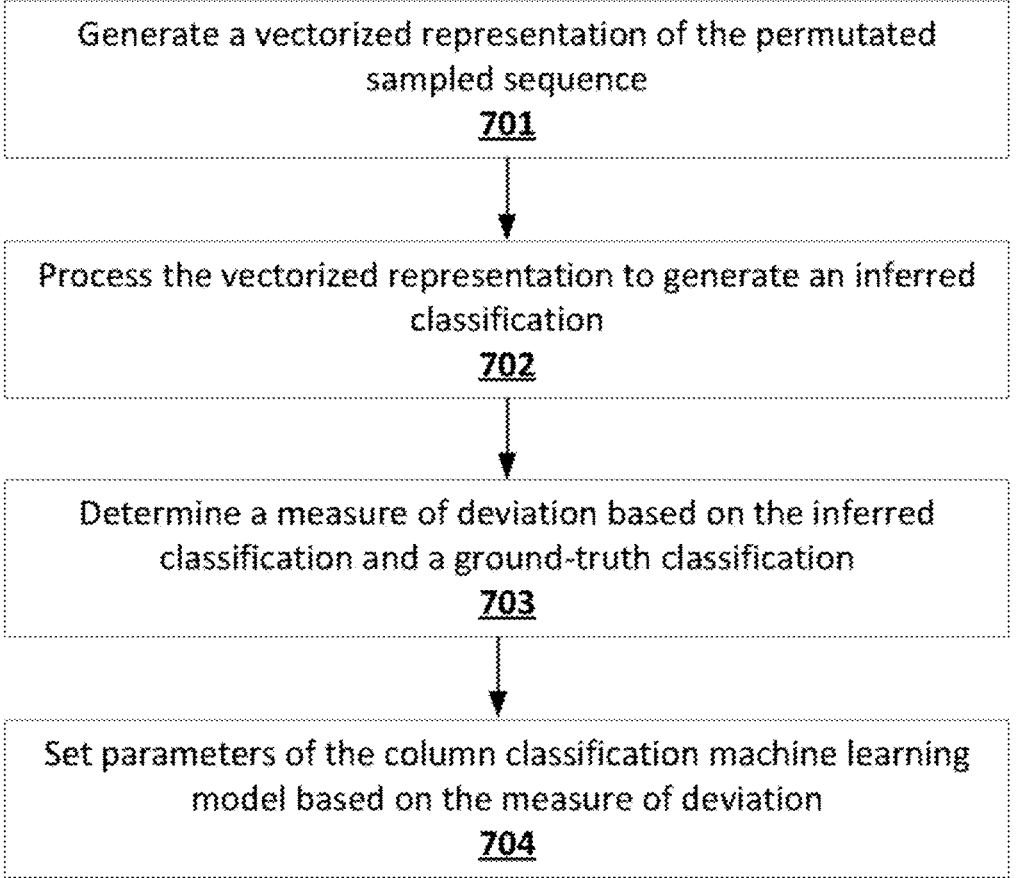

Generate a vectorized representation of the permutated sampled sequence
701

Process the vectorized representation to generate an inferred classification
702

Determine a measure of deviation based on the inferred classification and a ground-truth classification
703

Set parameters of the column classification machine learning model based on the measure of deviation
704

FIG. 7

900
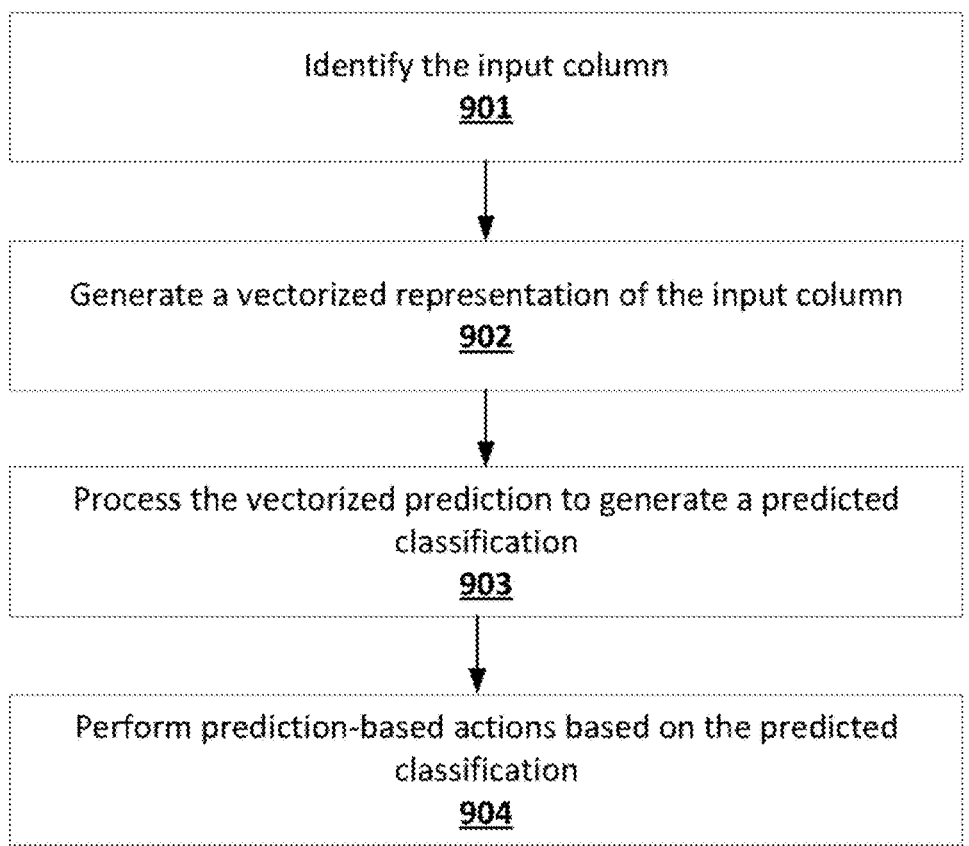
Identify the input column
901
Generate a vectorized representation of the input column
902
Process the vectorized prediction to generate a predicted classification
903
Perform prediction-based actions based on the predicted classification
904
FIG. 9

| PHI category type | Naming convention variations seen across databases |
|---|---|
| *member name* | *mbr_fst_nm, mem_nm, mbr_name* |
| Social Security Number | *ssn, ssn_nbr, mbr_ssn, soc_sec_nbr* |
| *Member gender* | *mbr_gdr, mem_gdr, mem_gdr_typ, gdr_typ_cd, mbr_gender* |

FIG. 12

Generate training columns
1501

Generate size-one sample sequences
1502

Generate a vectorized representation of each size-one sample sequence
1503

Process each vectorized representation to generate an inferred prediction
1504

Determine a measure of error
1505

Update parameters of the column classification machine learning model
1506

1600

| LANGUAGECODE1 | probability_of_not_phi | PHI category classes |
|---|---|---|
| VAI | 0.802726448 | Not PHI |
| VAI | 0.802726448 | Not PHI |
| HUP | 0.713888705 | Not PHI |
| HUP | 0.713888705 | PHI |
| ENG | 0.552235245 | Not PHI |
| VAI | 0.802726447 | Not PHI |
| 100****** ESTATES WAY | 0.000339171 | Address |
| 33******** | 0.006593791 | Social-Security Number |

COLUMN CLASSIFICATION MACHINE LEARNING MODELS

BACKGROUND

Various embodiments of the present invention address technical challenges related to performing classification-based predictive data analysis on named data collections. Various embodiments of the present invention address the efficiency and reliability shortcomings of existing classification-based predictive data analysis solutions when it comes to processing named data collections.

BRIEF SUMMARY

In general, embodiments of the present invention provide methods, apparatus, systems, computing devices, computing entities, and/or the like for performing classification-based predictive data analysis on named data collections. Certain embodiments of the present invention utilize systems, methods, and computer program products that perform threshold-based predictive data analysis on named data collections by utilizing at least one of techniques for generating column classification machine learning models that are configured to perform column classification, techniques for generating column classification machine learning models that are configured to perform anomaly detection, techniques for utilizing trained column classification machine learning models to perform column classification, and techniques for utilizing trained column classification machine learning models to perform anomaly detection.

In accordance with one aspect, a method is provided. In one embodiment, the method comprises: generating, by one or more computer processors and based on a training column and in accordance with a sampling size range, a plurality of defined-size sample sequences, wherein each defined-size sample sequence of the plurality of defined-size sample sequences is associated with a sample size value of a plurality of sample size values defined by the sample size range; generating, by the one or more computer processors and based on the plurality of defined-size sample sequences, a plurality of permutated sample sequences, wherein each permutated sample sequence of the plurality of permutated sample sequences is generated by permutating a defined-size sample sequence of the plurality of defined-size sample sequences; processing, by the one or more computer processors, each permutated sample sequence of the plurality of permutated sample sequences using the column classification machine learning model to generate an inferred sequence classification of a plurality of inferred sequence classifications for the permutated sample sequence; updating, by the one or more computer processors, one or more parameters of a column classification machine learning model based on each measure of deviation between an inferred sequence classification of the plurality of inferred sequence classifications and a ground-truth classification for the training column; and providing, by the one or more computer processors, access to the column classification machine learning model for processing an input column to generate a predicted classification for the input column and subsequently performing one or more prediction-based actions based on the predicted classification.

In accordance with another aspect, a computer program product is provided. The computer program product may comprise at least one computer-readable storage medium having computer-readable program code portions stored therein, the computer-readable program code portions comprising executable portions configured to: generate, by one or more computer processors and based on a training column and in accordance with a sampling size range, a plurality of defined-size sample sequences, wherein each defined-size sample sequence of the plurality of defined-size sample sequences is associated with a sample size value of a plurality of sample size values defined by the sample size range; generate, by the one or more computer processors and based on the plurality of defined-size sample sequences, a plurality of permutated sample sequences, wherein each permutated sample sequence of the plurality of permutated sample sequences is generated by permutating a defined-size sample sequence of the plurality of defined-size sample sequences; process, by the one or more computer processors, each permutated sample sequence of the plurality of permutated sample sequences using the column classification machine learning model to generate an inferred sequence classification of a plurality of inferred sequence classifications for the permutated sample sequence; update, by the one or more computer processors, one or more parameters of a column classification machine learning model based on each measure of deviation between an inferred sequence classification of the plurality of inferred sequence classifications and a ground-truth classification for the training column; and provide, by the one or more computer processors, access to the column classification machine learning model for processing an input column to generate a predicted classification for the input column and subsequently performing one or more prediction-based actions based on the predicted classification.

In accordance with yet another aspect, an apparatus comprising at least one processor and at least one memory including computer program code is provided. In one embodiment, the at least one memory and the computer program code may be configured to, with the processor, cause the apparatus to: generate, by one or more computer processors and based on a training column and in accordance with a sampling size range, a plurality of defined-size sample sequences, wherein each defined-size sample sequence of the plurality of defined-size sample sequences is associated with a sample size value of a plurality of sample size values defined by the sample size range; generate, by the one or more computer processors and based on the plurality of defined-size sample sequences, a plurality of permutated sample sequences, wherein each permutated sample sequence of the plurality of permutated sample sequences is generated by permutating a defined-size sample sequence of the plurality of defined-size sample sequences; process, by the one or more computer processors, each permutated sample sequence of the plurality of permutated sample sequences using the column classification machine learning model to generate an inferred sequence classification of a plurality of inferred sequence classifications for the permutated sample sequence; update, by the one or more computer processors, one or more parameters of a column classification machine learning model based on each measure of deviation between an inferred sequence classification of the plurality of inferred sequence classifications and a ground-truth classification for the training column; and provide, by the one or more computer processors, access to the column classification machine learning model for processing an input column to generate a predicted classification for the input column and subsequently performing one or more prediction-based actions based on the predicted classification.

In accordance with a different aspect, a method is provided. In one embodiment, the method comprises: for each input column value of a plurality of input column values of the input column: processing, by one or more computer processors, an input column vector for the input column value using a column classification machine learning model to generate a predicted classification of a plurality of predicted classification for the input column value, and determining, by the one or more computer processors, a per-value anomaly prediction for the input column value based on a distance measure between the predicted classification for the input column value and a per-column probability distribution measure of the plurality of predicted classifications; determining, by the one or more computer processors, a per-column anomaly prediction for the input column based on each per-value anomaly prediction for an input column value of the plurality of input column values; and performing, by the one or more computer processors, one or more prediction-based actions based on the per-column anomaly prediction.

In accordance with another aspect, a computer program product is provided. The computer program product may comprise at least one computer-readable storage medium having computer-readable program code portions stored therein, the computer-readable program code portions comprising executable portions configured to: for each input column value of a plurality of input column values of the input column: process, by one or more computer processors, an input column vector for the input column value using a column classification machine learning model to generate a predicted classification of a plurality of predicted classification for the input column value, and determine, by the one or more computer processors, a per-value anomaly prediction for the input column value based on a distance measure between the predicted classification for the input column value and a per-column probability distribution measure of the plurality of predicted classifications; determine, by the one or more computer processors, a per-column anomaly prediction for the input column based on each per-value anomaly prediction for an input column value of the plurality of input column values; and perform, by the one or more computer processors, one or more prediction-based actions based on the per-column anomaly prediction.

In accordance with yet another aspect, an apparatus comprising at least one processor and at least one memory including computer program code is provided. In one embodiment, the at least one memory and the computer program code may be configured to, with the processor, cause the apparatus to: for each input column value of a plurality of input column values of the input column: process, by one or more computer processors, an input column vector for the input column value using a column classification machine learning model to generate a predicted classification of a plurality of predicted classification for the input column value, and determine, by the one or more computer processors, a per-value anomaly prediction for the input column value based on a distance measure between the predicted classification for the input column value and a per-column probability distribution measure of the plurality of predicted classifications; determine, by the one or more computer processors, a per-column anomaly prediction for the input column based on each per-value anomaly prediction for an input column value of the plurality of input column values; and perform, by the one or more computer processors, one or more prediction-based actions based on the per-column anomaly prediction.

BRIEF DESCRIPTION OF THE DRAWINGS

Figure 1:

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
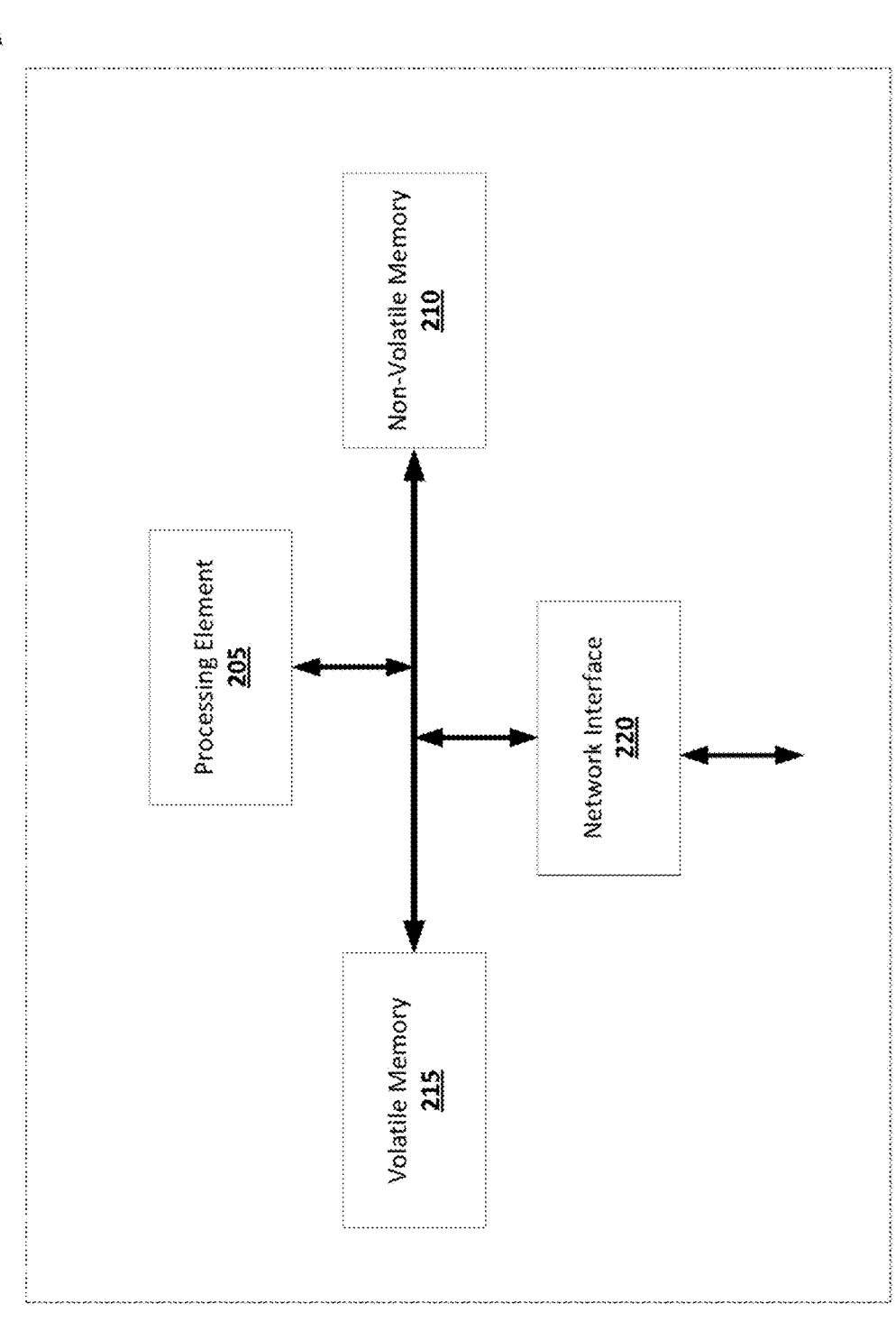

FIG. 2 provides an example predictive data analysis computing entity in accordance with some embodiments discussed herein.

FIG. 3 provides an example external computing entity in accordance with some embodiments discussed herein.

FIG. 4 is a flowchart diagram of an example process for generating a column classification machine learning model to perform column classification in accordance with some embodiments discussed herein.

FIG. 5 is a flowchart diagram of an example process for generating training columns used to train a column classification machine learning model that is configured to perform column classification in accordance with some embodiments discussed herein.

Figure 6:
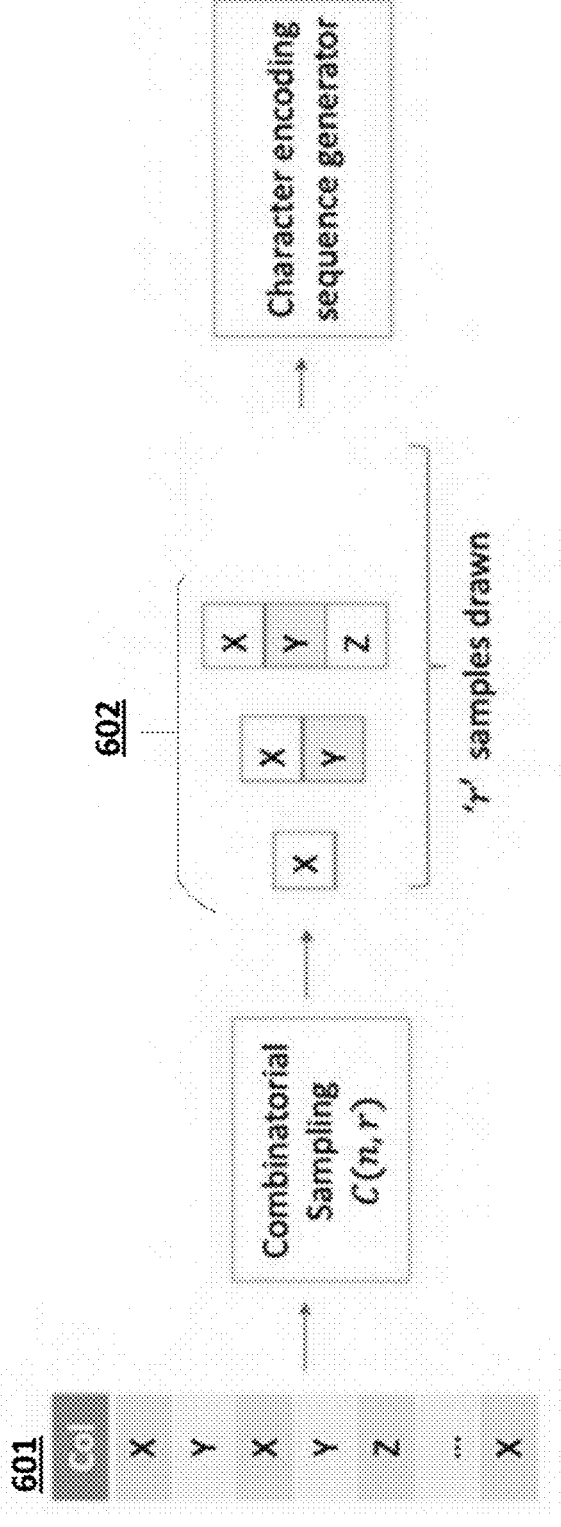

FIG. 6 provides an operational example of generating a set of defined-size sample sequences for a training column in accordance with some embodiments discussed herein.

FIG. 7 is a flowchart diagram of an example process for training a column classification machine learning model using permutated sample sequences generated based on training columns in accordance with some embodiments discussed herein.

Figure 8:
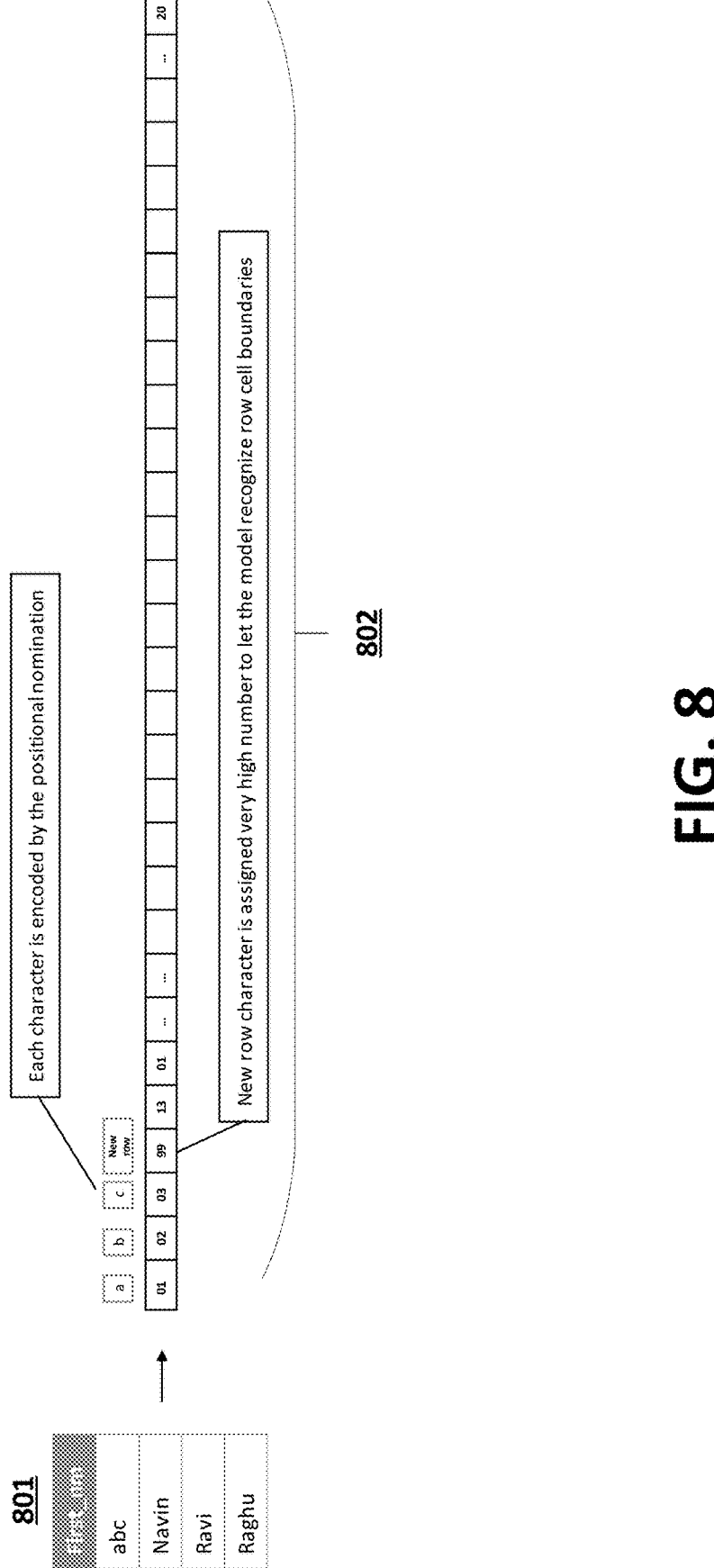

FIG. 8 provides an operational example of generating a vectorized representation of a permutated sample sequence in accordance with some embodiments discussed herein.

FIG. 9 is a flowchart diagram of an example process for performing a column classification using a trained column classification machine learning model in accordance with some embodiments discussed herein.

Figure 10:
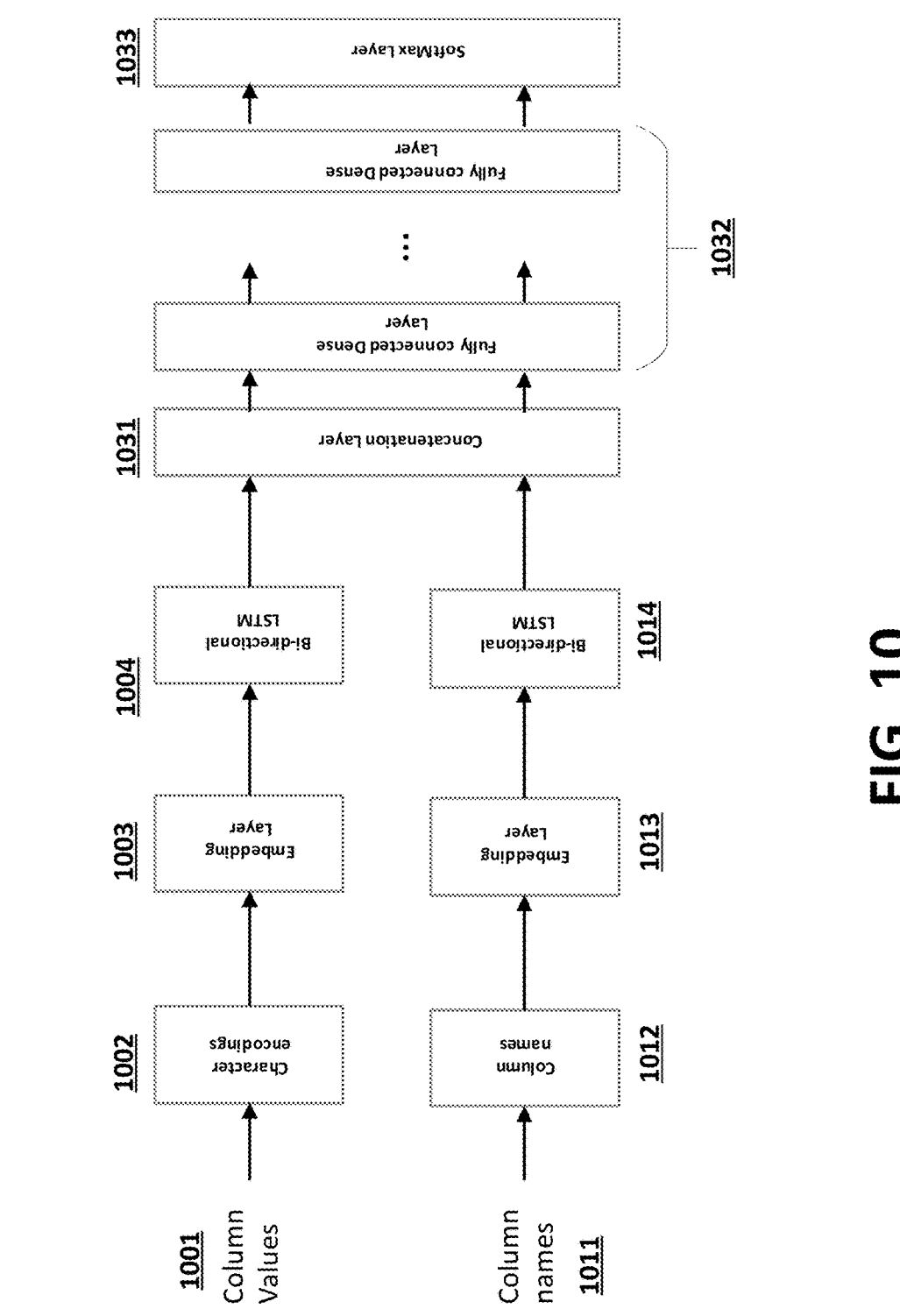

FIG. 10 provides an operational example of a name-based column classification machine learning model in accordance with some embodiments discussed herein.

Figure 11:
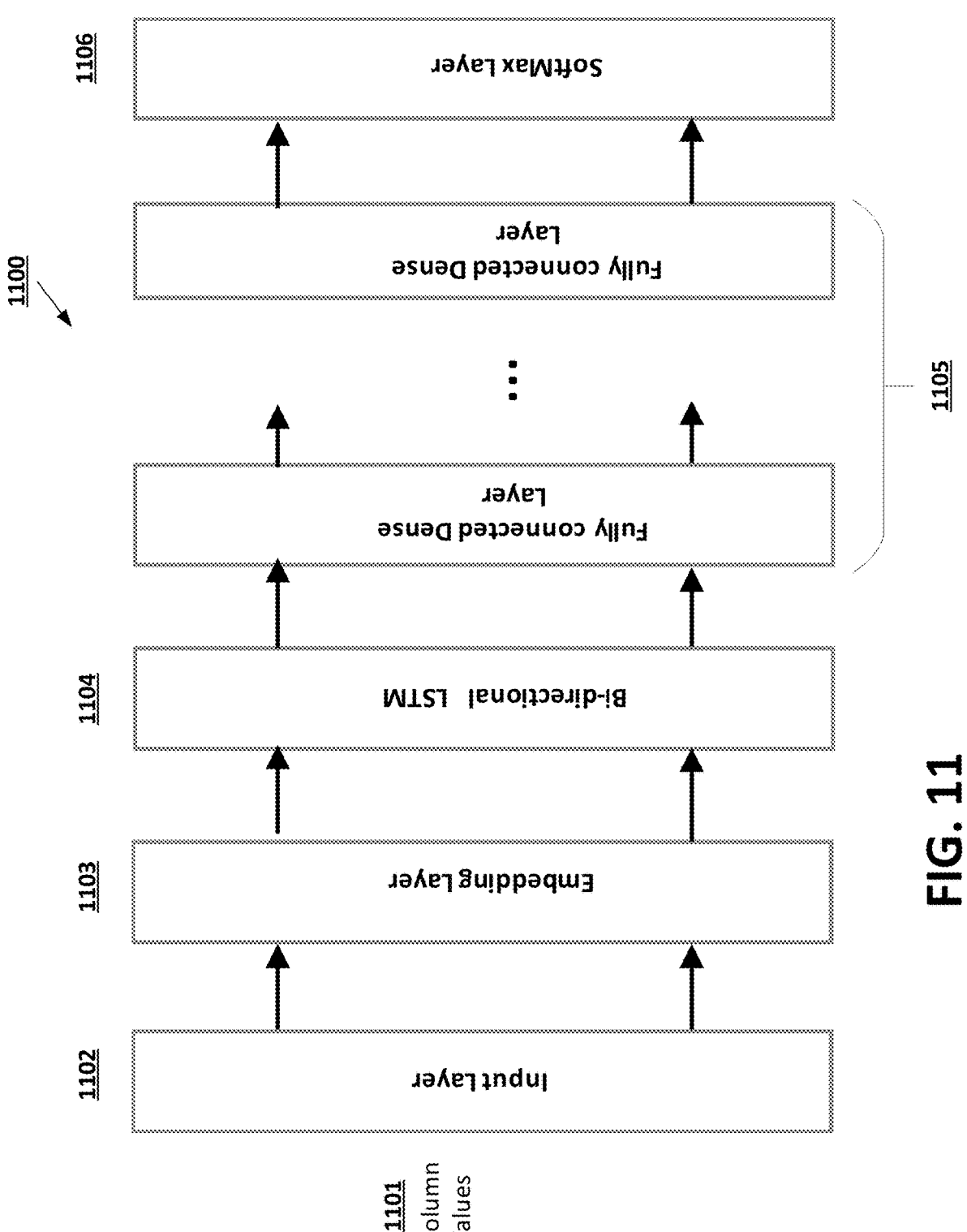

FIG. 11 provides an operational example of a non-name-based column classification machine learning model in accordance with some embodiments discussed herein.

FIG. 12 provides an operational example of a dictionary-based column name validator machine learning model in accordance with some embodiments discussed herein.

Figure 13:
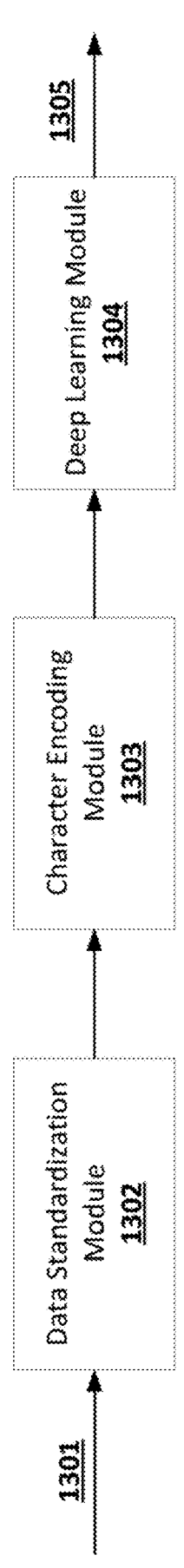

FIG. 13 provides an operational example of a format inference machine learning model in accordance with some embodiments discussed herein.

Figure 14:
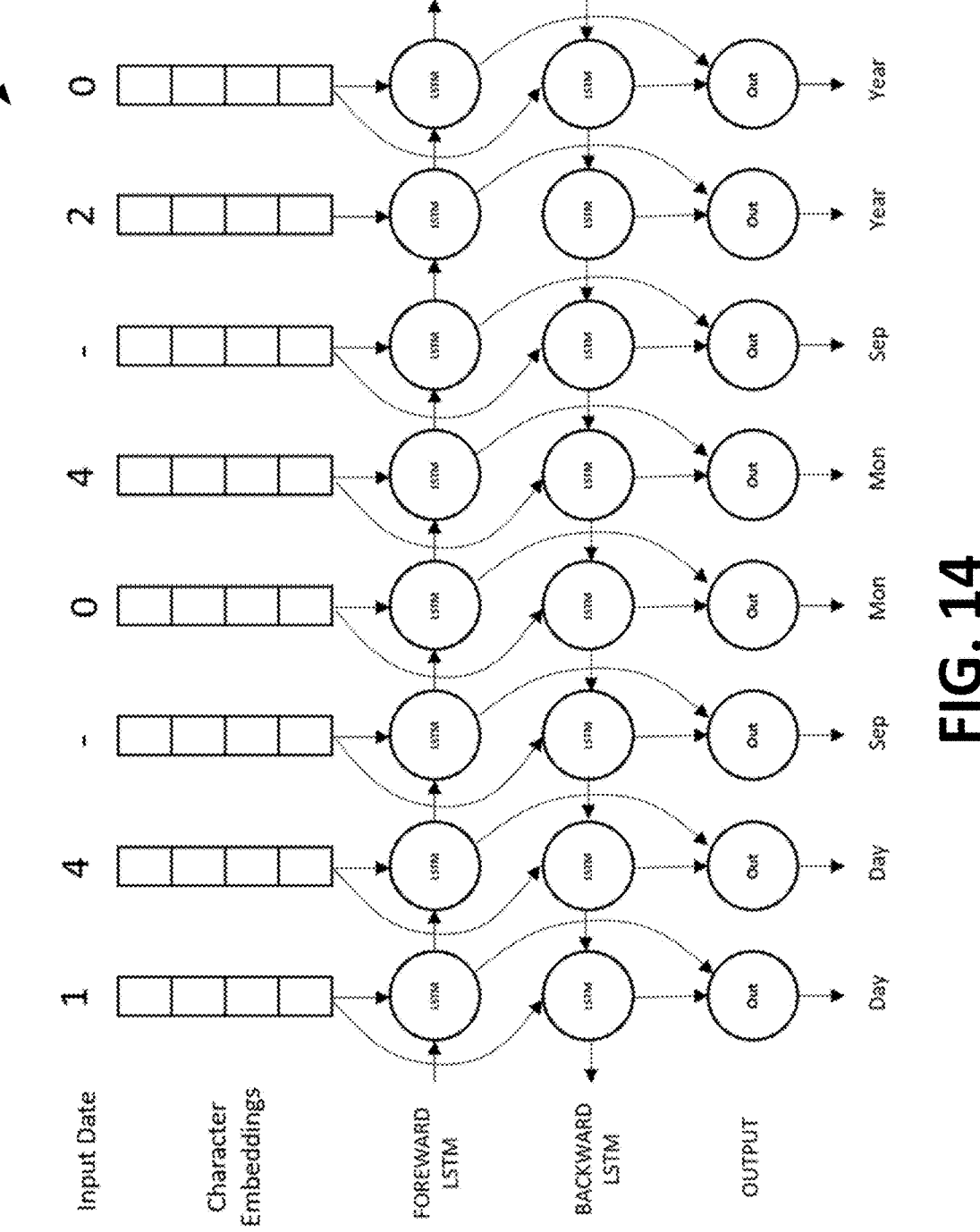

FIG. 14 provides an operational example of a bidirectional long short-term memory machine learning model that is configured to generate an inferred column value format of a column value in accordance with some embodiments discussed herein.

Figure 15:

FIG. 15 is a flowchart diagram of an example process for generating a column classification machine learning model that is configured to perform anomaly detection in accordance with some embodiments discussed herein.

Figure 16:
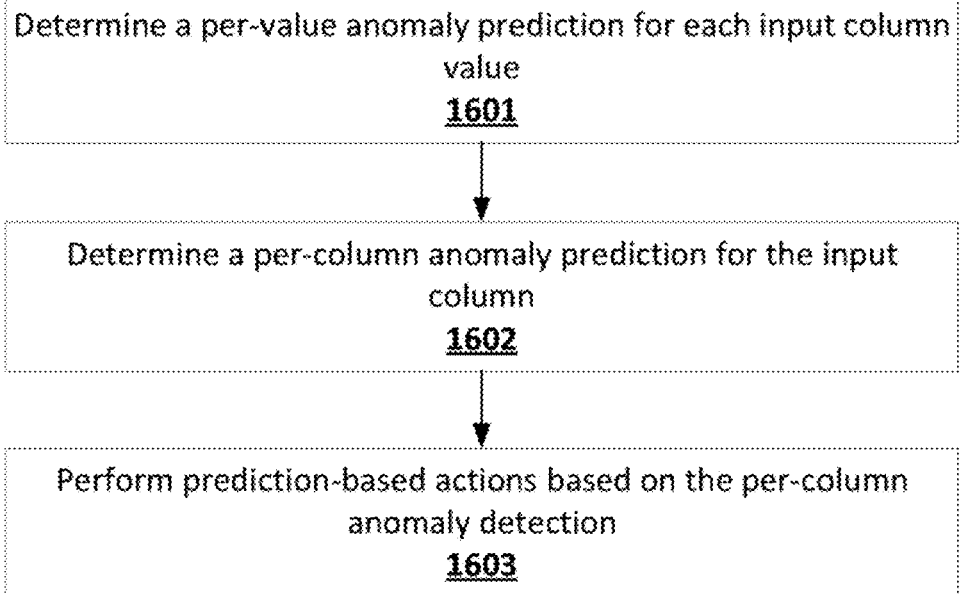

FIG. 16 is a flowchart diagram of an example process for performing anomaly detection using a trained column classification machine learning model in accordance with some embodiments discussed herein.

FIG. 17 provides an operational example of generating per-value error predictions and per-column error predictions in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical problems related to efficiency and reliability of performing column classification by introducing machine-learning-based techniques for performing column classification that generate varied training data by modifying raw training columns in accordance with a variety of column augmentation techniques and/or sub-column sampling techniques. By utilizing these techniques, various embodiments of the present invention are able to utilize limited amounts of raw training data to generate a vast amount of derivative training data that not only enable more meaningful and predictively valuable training cycles, but also present varied textual configurations of the same types of columns to the column classification machine learning models during training processes, which in turn increases the robustness of the trained column classification machine learning models. In doing so, various embodiments of the present invention are able to reduce the need for retraining of column classification machine learning models and increase the reliability of trained column classification machine learning models in performing column classification. Accordingly, by introducing machine-learning-based techniques for performing column classification that generate varied training data by modifying raw training columns in accordance with a variety of column augmentation techniques and/or sub-column sampling techniques, various embodiments of the present invention address technical problems related to efficiency and reliability of performing column classification and make important technical contributions to the field of classification-based predictive data analysis.

Various embodiments of the present invention address technical problems related to efficiency and reliability of performing column value anomaly detection by utilizing the output of a column classification machine learning model with respect to a column value in order to generate an anomaly detection machine learning model. In doing so, the noted embodiments of the present invention both prevent the need for maintaining two separate machine learning solutions for performing column classification and anomaly detection (which in turn avoids the computational overhead of simultaneously storing, training, and executing two separate machine learning models) and enable using a computationally efficient column classification machine learning model to perform anomaly detection. Accordingly, by utilizing the output of a column classification machine learning model with respect to a column value in order to generate an anomaly detection machine learning model, various embodiments of the present invention address technical problems related to efficiency and reliability of performing column value anomaly detection and make important technical contributions to the field of anomaly-detection-based predictive data analysis.

A large organization has many business/technical processes which consume data to produce data driven outcomes. Almost at all times these processes use sensitive PHI data, for example, patient name and SSN. The PHI data stored in various databases is exposed to many business analysts and others. It remains a challenge to correctly identify the PHI data. Existing PHI identification processes are mostly manual, which make those processes time consuming and erroneous. Moreover, in some data sources, for example in a data lake, there are times when the metadata is also missing. Sometimes, there are tables with non-comprehensible column names. It is in these scenarios that identification of PHI data is particularly challenging and time consuming when using manual approaches.

Various embodiments of the present invention automatically tag/identify various Protected Health Information (PHI) columns like social security number (SSN), member names, and/or the like, using a novel deep learning based framework. This framework takes in both raw/actual column values and the column names as inputs. It then maps the columns to the pre-defined PHI categories/classes. The framework takes in data from databases maps segments of the noted data to correct PHI categories. The framework further uses a novel sampling based training approach. This distributional training approach helps the deep learning architecture to reach the desired performance. In some embodiments, subsequent to PHI tagging, the masking module identifies the shape of the data for the PHI columns and then applies masking on the data sample for visual display. The identified PHI data is then processed through the data anonymization module.

Various embodiments of the present invention further introduce a robust state of the art mechanism to capture potential data theft or data error and data anomalies. Various embodiments of the present invention further enable an intelligent data masking framework that first identifies the shape of the data and then masks the data before it is displayed on any platforms. Various embodiments the present invention also anonymize the data while retaining the behavioral features of the data through anonymization. Various embodiments of the present invention determine whether a given column is in a PHI category or not. The noted embodiments disclose a solution that takes in a column as input. The solution then uses a unique deep learning architecture to consume the values and column name together to predict the type of PHI for the column. Then, based on a defined configuration, the solution can then either mask or anonymize the data. In general, a PHI category refers to a data type that is deemed to be confidential/sensitive by virtue of association with the data type. Examples of PHI categories include social security number PHI category, member name PHI category, and/or the like. In some embodiments, a column classification machine learning model is trained to detect whether an input column is associated with a PHI category and/or the particular PHI category to which the input column belongs.

In some embodiments, the deep learning model is trained through a novel mechanism, which improves the accuracy of the model drastically. In some embodiments, the data masking module uses another model, which predicts the shape of an input column. Various embodiments of the proposed solution can be applicable/used anywhere PHI data is required/used.

Various kinds of platforms can be integrated into the proposed solution. Some of the platforms and their requirements are listed below: reporting platforms (here in some embodiments PHI data needs to be masked before the reports are shared/displayed in a web-based UI for stake-holders/clients); big data processing applications (here in some embodiments the PHI data is used to derive business driven outcomes, but data has to first be anonymized and then taken up for processing); and machine learning platforms (here the in some embodiments PHI data has to be anonymized and then taken up for further processing).

II. DEFINITIONS

The term "column" may refer to a data entity that is configured to describe a collection of values that are grouped together and collectively associated with a column. While an example of a column is a column of values in a relational table as part of a relational database, a person of ordinary skill in the relevant technology will recognize that other named groupings of values may functionally be equivalent to a relational table column and thus be subject to column classification techniques introduced by various embodiments of the present invention. In some embodiments, a column is associated with a value set, which includes each column value that is associated with the column as well as a column name. In some embodiments, a column that is associated with a ground-truth classification (e.g., a ground-truth classification describing whether a column includes sensitive information, such as patient health information (PHI) and/or patient identifying information (PII)) is referred to herein as a training column, as such a column may be utilized in accordance with one or more training algorithms to train a column classification machine learning model. In some embodiments, a column that is not associated with a ground-truth classification is referred to herein as an input column, as such a column may be processed by a trained column classification machine learning model to generate a predicted classification (e.g., a predicted classification describing whether a column includes sensitive information) for the input column.

The term "ground-truth classification" may refer to a data entity that is configured to describe an observed determination about whether a corresponding training column includes sensitive information, where the observed determination may be determined based on manual labeling of the raw training input and/or based on data about historical desensitizing operations (e.g., data masking operations, data anonymization operations, and/or the like) performed with respect to the corresponding training column. As discussed below, the ground-truth classification may be utilized to provide ground-truth data that may be used by one or more training algorithms to train a column classification machine learning model.

The term "shuffled column" may refer to a data entity that is configured to describe a column that is generated by performing a shuffling (e.g., a randomized shuffling) of one or more column values of a source column, where the shuffled column may have the same column name as the source column and, if the source column is a training column that is associated with a ground-truth classification, the shuffled column may be associated with the same ground-truth classification as the source column. For example, given a source column that includes the ordered column value set $\{A, B, C\}$, is associated with the column name $N_1$, and is associated with the ground-truth classification $G_1$, examples of shuffled columns generated by performing shuffling of the one or more values of the noted source column include: a shuffled column that includes the ordered set of values $\{A, C, B\}$, is associated with the column name $N_1$, and is associated with the ground-truth classification $G_1$; a shuffled column that includes the ordered set of values $\{B, C, A\}$, is associated with the column name $N_1$, and is associated with the ground-truth classification $G_1$; a shuffled column that includes the ordered set of values $\{C, B, A\}$, is associated with the column name $N_1$, and is associated with the ground-truth classification $G_1$; a shuffled column that includes the ordered set of values $\{B, A, C\}$, is associated with the column name $N_1$, and is associated with the ground-truth classification $G_1$; and/or the like.

The term "null-inserted column" may refer to a data entity that is configured to describe a column that is generated by converting a defined subset of column values of a source column into null values, where the null-inserted column may have the same column name as the source column and, if the source column is a training column that is associated with a ground-truth classification, the null-inserted column may be associated with the same ground-truth classification as the source column. In some embodiments, a null-inserted column may be generated by converting a particular ratio (e.g., five percent) of the column values of a source column into null values, where identifying the particular ratio of the column values of a source column may be performed using a random selection process. For example, given a source column that includes the ordered column value set $\{A, B, C, D\}$, is associated with the column name $N_1$, and is associated with the ground-truth classification $G_1$, and further given a 25 percent null value insertion ratio, examples of null-inserted columns generated by performing null value insertion based on the noted source column include: a null-inserted column that includes the ordered set of values $\{A, B, C, NULL\}$, is associated with the column name $N_1$, and is associated with the ground-truth classification $G_1$; a null-inserted column that includes the ordered set of values $\{A, B, NULL, D\}$, is associated with the column name $N_1$, and is associated with the ground-truth classification $G_1$; a null-inserted column that includes the ordered set of values $\{A, NULL, C, D\}$, is associated with the column name $N_1$, and is associated with the ground-truth classification $G_1$; and a null-inserted column that includes the ordered set of values $\{NULL, B, C, D\}$, is associated with the column name $N_1$, and is associated with the ground-truth classification $G_1$.

The term "defined-size sample sequence" may refer to a data entity that is configured to describe a subset of a corresponding column that is generated by selecting a subset of the column values of the corresponding column that has a defined size, where the selection of the subset of column values of the corresponding column may be performed using a random selection process, and where the defined size of the subset may be determined using a sample size value that is selected value a sample size range. In some embodiments, to generate the set of defined-size sample sequences from a particular training column, the predictive data analysis computing entity 106 may select n sequences of a size defined by each sample size value r from each training column, where the value of r may be defined by a sample size range of R that defines one or more sample size values, such as a range of sample size values. For example, in an exemplary embodiments in, which n=1 and R=$\{1, 2, 3, 4, 5, 6, 7, 8, 9, 10\}$, the predictive data analysis computing entity 106 may generate a set of defined-size sample sequences for each training column that includes the following defined-size sample sequences: a defined-size sample sequence that includes one sequence of size one that is selected from the training column, a defined-size sample sequence that includes one sequence of size two that is selected from the training column, a defined-size sample sequence that includes one sequence of size three that is selected from the training column, a defined-size sample sequence that includes one sequence of size four that is selected from the training column, a defined-size sample sequence that includes one sequence of size five that is selected from the training column, a defined-size sample sequence that includes one sequence of six one that is selected from the training column, a defined-size sample sequence that includes one sequence of size seven that is selected from the training column, a defined-size sample sequence that includes one sequence of size eight that is selected from the training column, a defined-size sample sequence that includes one sequence of size nine that is selected from the training column, and a defined-size sample sequence that includes one sequence of size ten that is selected from the training column. As another example, in an exemplary embodiments in, which n=5 and R={1, 2, 3, 4, 5, 6, 7, 8, 9, 10}, the predictive data analysis computing entity 106 may generate a set of defined-size sample sequences for each training column that includes the following defined-size sample sequences: a defined-size sample sequence that includes five sequences of size one that is selected from the training column, a defined-size sample sequence that includes five sequences of size two that is selected from the training column, a defined-size sample sequence that includes five sequences of size three that is selected from the training column, a defined-size sample sequence that includes five sequences of size four that is selected from the training column, a defined-size sample sequence that includes five sequences of size five that is selected from the training column, a defined-size sample sequence that includes five sequences of six one that is selected from the training column, a defined-size sample sequence that includes five sequences of size seven that is selected from the training column, a defined-size sample sequence that includes five sequences of size eight that is selected from the training column, a defined-size sample sequence that includes five sequences of size nine that is selected from the training column, and a defined-size sample sequence that includes five sequences of size ten that is selected from the training column. In some embodiments, defined-size sample sequences are generated by selecting a unique subset of the column values of the corresponding column that has a defined size, where the selection of the subset of column values of the corresponding column may be performed using a random selection process, and where the defined size of the subset may be determined using a sample size value that is selected value a sample size range. For example, given a training column that consists of the three values {M, U, F}, n=2, and R={1, 2, 3, 4, 5, 6, 7, 8, 9, 10}, the predictive data analysis computing entity 106 may generate a set of defined-size sample sequences for each training column that includes the following defined-size sample sequences: a defined-size sample sequence that includes two sequences of size one that is selected from the training column, a defined-size sample sequence that includes two sequences of size two that is selected from the training column where each sequence includes two unique values (e.g., {M, F} and {M, U}), and a defined-size sample sequence that includes two sequences of size three that is selected from the training column where each sequence includes three unique values (e.g., {M, F, U} and {M, U, F}). Here, because each sequence must include unique values, despite the fact that R={1, 2, 3, 4, 5, 6, 7, 8, 9, 10}, sampling stops at n=3.

The term "permutated sequence" may refer to a data entity that is configured to describe a sequence of values (e.g., a sequence of column values) that is generated by changing an initial ordering of the sequence of values, where the order modification may be performed using a random modification process. For example, given a defined-size sample sequence that includes the ordered list of values {A, B, C, D}, examples of permutated sample sequences that may be generated based on the defined-size sample sequence include: a permutated sample sequence that includes the ordered list of values {A, C, B, D}, a permutated sample sequence that includes the ordered list of values {A, C, B, D}, a permutated sample sequence that includes the ordered list of values {A, D, B, C}, a permutated sample sequence that includes the ordered list of values {A, C, D, B}, a permutated sample sequence that includes the ordered list of values {C, A, B, D}, a permutated sample sequence that includes the ordered list of values {A, C, B, D}, and a permutated sample sequence that includes the ordered list of values {D, C, B, A}. In some embodiments, each defined-size sample sequence is used to generate m permutated sample sequences. In some embodiments, given a defined-size sample sequence of size s, the m value for the noted defined-size sample sequence may be s!, meaning a corresponding computing entity captures all of the possible permutations of the noted defined-size sample sequence as part of the set of permutated sample sequences that are associated with the training column that is used to generate the noted defined-size sample sequence.

The term "column classification machine learning model" may refer to a data entity that is configured to describe parameters and/or hyper-parameters of a machine learning model that is configured to process a vectorized representation of column values of an input column in order to generate a predicted classification for the input column. In some embodiments, in addition to using the vectorized representation of the column values of the input column, the column classification machine learning model additionally uses a vectorized representation of the column name of the input column in order to generate the predicted classification for the input column. In some embodiments, the column classification machine learning model includes at least two components: a name-based component (also referred to herein as a name-based column classification machine learning model) and a non-name-based component (also referred to herein as a non-name-based classification machine learning model), where the name-based component of the column classification machine learning model may be configured to process both the vectorized representation of the column values of an input column and the vectorized representation of the column names of the input column in order to generate a name-based predicted classification for the input column, and further where the non-name-based component of the column classification machine learning model may be configured to process the vectorized representation of the column values of an input column but not the vectorized representation of the column names of the input column in order to generate a non-name-based predicted classification for the input column.

The term "inferred classification" may refer to a data entity that is configured to describe an inferred probability that a corresponding input data object (e.g., a corresponding permutated sample sequence) belongs to a target classification (e.g., a sensitive information classification, such as a PHI classification or a PII classification), where the inferred probability is determined during the training of a column classification machine learning model based on a then-existing state (e.g., an initial state, during a first-time training) of the parameters and/or the hyper-parameters of the column classification machine learning model. As described below, an inferred classification for a corresponding input data object may be compared during the training process for training a column classification machine learning to the ground-truth classification for the corresponding input data object to generate a measure of deviation for the corresponding input data object, where the measure of deviation can then in turn be used to set optimal values for the parameters of the column classification machine learning model as part of the training process. For example, if a permutated sample sequence is associated with an affirmative ground-truth classification and an inferred classification of 0.9, the per-sequence measure of deviation for the permutated sample sequence may be 1.0–0.9=0.1, which in turn may be used in conjunction with other measures of deviations for other permutated sample sequences determined based on training columns in order to define a measure of deviation (e.g., an error function or a utility function) that can be used to set parameters of the column classification machine learning model.

The term "column name validator machine learning model" may refer to a data entity that is configured to describe parameters and/or hyper-parameters of a machine learning model that is configured to generate a predicted validation classification for a column based on the column name for the column. In some embodiments, the column name validator machine learning model includes a dictionary of validated column names, where if the column name for a column corresponds to one of the entries in the dictionary, an affirmative predicted validation classification is determined for the column, while if the column name for a column fails to correspond to one of the entries in the dictionary, a negative predicted validation classification is determined for the column. In some embodiments, the column name validator machine learning model includes a trained classification model that is configured to trained to detect a predicted validation classification for a column based on a vectorized representation of the column name for the column.

The term "predicted validation classification" may refer to a data entity that is configured to describe a conclusion about whether a column name of a corresponding column is deemed a valid/reliable column name. As described above, the predicted validation classification for a column may be determined using a dictionary-based column name validator machine learning model and/or a trained classification column name validator machine learning model. In some embodiments, when the predicted validation classification is determined using a dictionary-based column name validator machine learning model, the predicted validation classification describes whether the column name for a corresponding column corresponds to an entry in the dictionary associated with the dictionary-based column name validator machine learning model. In some embodiments, when the predicted validation classification is determined using a trained classification column name validator machine learning model, the predicted validation classification describes whether an inferred validation probability generated by the trained classification column name validator machine learning model via processing the column name for a corresponding column satisfies (e.g., exceeds) a defined inferred validation probability threshold, such as a defined inferred validation probability threshold of 0.5.

The term "predicted classification" may refer to a data entity that is configured to describe a predicted probability that a corresponding input data object (e.g., a corresponding input column) belongs to a target classification (e.g., a sensitive information classification, such as a PHI classification or a PII classification), where predicted probability is generated by processing the corresponding input data object using a trained column classification machine learning model. As discussed above, the predicted probability for a corresponding input data object may be determined based on one or more features of the corresponding input data object, where the features are determined in accordance with the architecture of the column classification machine learning model, which in turn defines an acceptable input format for the column classification machine learning. For example, if the corresponding input data object is an input column, the input features of the input column may include the column value set associated with the input column and/or the column name string associated with the input column.

The term "per-value anomaly prediction" may refer to a data entity that is configured to describe a predicted conclusion about whether a corresponding column value is anomalous, where the predicted conclusion may be determined based on a relationship of a predicted classification for the corresponding column value and a distribution of all predicted classifications for all of the column values of the column that includes the corresponding column value. In some embodiments, to generate the per-value anomaly prediction for a particular input column value of a particular input column, a predictive data analysis computing entity processes the input column vector for the input column value using the trained column classification machine learning model to generate a predicted classification for the input column value. Thereafter, the predictive data analysis computing entity determines a measure of distance between the predicted classification for the input column value and a per-column probability distribution measure for each predicted classification that is associated with an input column value for the input column (e.g., a mean of all predicted classifications associated with the input column values of the input column, a median of all predicted classifications associated with the input column values of the input column, a mode of all predicted classifications associated with the input column values of the input column, a variance of all predicted classifications associated with the input column values of the input column, a standard deviation of all predicted classifications associated with the input column values of the input column, and/or the like). Afterward, the predictive data analysis computing entity determines the per-value anomaly prediction based on the measure of deviation, e.g., based on whether the measure of deviation fails to satisfy (e.g., fails to exceed) a deviation measure threshold. For example, a determination that the measure of deviation for a particular input column value fails to satisfy a deviation measure threshold may lead to a negative per-value anomaly prediction, while a determination that the measure of deviation for a particular input column value satisfies a deviation measure threshold may lead to a positive per-value anomaly prediction.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 config-
ured to receive predictive data analysis requests from exter-
nal computing entities 102, process the predictive data
analysis requests to generate predictions, provide the gen-
erated predictions to the external computing entities 102,
and automatically perform prediction-based actions based at
least in part on the generated predictions. Examples of
predictive tasks that can be generated using the predictive
data analysis system 101 is a predictive task about whether
a column includes sensitive information, a predictive task
about whether a column includes anomalous column values,
a predictive task about whether a column value is an
anomalous column value given the column association of
the column value, and/or the like.

In some embodiments, predictive data analysis system
101 may communicate with at least one of the external
computing entities 102 using one or more communication
networks. Examples of communication networks include
any wired or wireless communication network including, for
example, a wired or wireless local area network (LAN),
personal area network (PAN), metropolitan area network
(MAN), wide area network (WAN), or the like, as well as
any hardware, software and/or firmware required to imple-
ment it (such as, e.g., network routers, and/or the like).

The predictive data analysis system 101 may include a
predictive data analysis computing entity 106 and a storage
subsystem 108. The predictive data analysis computing
entity 106 may be configured to receive predictive data
analysis requests from one or more external computing
entities 102, process the predictive data analysis requests to
generate predictions corresponding to the predictive data
analysis requests, provide the generated predictions to the
external computing entities 102, and automatically perform
prediction-based actions based at least in part on the gen-
erated predictions.

The storage subsystem 108 may be configured to store
input data used by the predictive data analysis computing
entity 106 to perform predictive data analysis as well as
model definition data used by the predictive data analysis
computing entity 106 to perform various predictive data
analysis tasks. The storage subsystem 108 may include one
or more storage units, such as multiple distributed storage
units that are connected through a computer network. Each
storage unit in the storage subsystem 108 may store at least
one of one or more data assets and/or one or more data about
the computed properties of one or more data assets. More-
over, each storage unit in the storage subsystem 108 may
include one or more non-volatile storage or memory media
including, but not limited to, hard disks, ROM, PROM,
EPROM, EEPROM, flash memory, MMCs, SD memory
cards, Memory Sticks, CBRAM, PRAM, FeRAM,
NVRAM, MRAM, RRAM, SONOS, FJG RAM, Millipede
memory, racetrack memory, and/or the like.

Exemplary Predictive Data Analysis Computing Entity

FIG. 2 provides a schematic of a predictive data analysis
computing entity 106 according to one embodiment of the
present invention. In general, the terms computing entity,
computer, entity, device, system, and/or similar words used
herein interchangeably may refer to, for example, one or
more computers, computing entities, desktops, mobile
phones, tablets, phablets, notebooks, laptops, distributed
systems, kiosks, input terminals, servers or server networks,
blades, gateways, switches, processing devices, processing
entities, set-top boxes, relays, routers, network access
points, base stations, the like, and/or any combination of
devices or entities adapted to perform the functions, opera-
tions, and/or processes described herein. Such functions, operations, and/or processes may include, for example,
transmitting, receiving, operating on, processing, display-
ing, storing, determining, creating/generating, monitoring,
evaluating, comparing, and/or similar terms used herein
interchangeably. In one embodiment, these functions, opera-
tions, and/or processes can be performed on data, content,
information, and/or similar terms used herein interchange-
ably.

As indicated, in one embodiment, the predictive data
analysis computing entity 106 may also include one or more
communications interfaces 220 for communicating with
various computing entities, such as by communicating data,
content, information, and/or similar terms used herein inter-
changeably that can be transmitted, received, operated on,
processed, displayed, stored, and/or the like.

As shown in FIG. 2, in one embodiment, the predictive
data analysis computing entity 106 may include, or be in
communication with, one or more processing elements 205
(also referred to as processors, processing circuitry, and/or
similar terms used herein interchangeably) that communi-
cate with other elements within the predictive data analysis
computing entity 106 via a bus, for example. As will be
understood, the processing element 205 may be embodied in
a number of different ways.

For example, the processing element 205 may be embod-
ied as one or more complex programmable logic devices
(CPLDs), microprocessors, multi-core processors, copro-
cessing entities, application-specific instruction-set proces-
sors (ASIPs), microcontrollers, and/or controllers. Further,
the processing element 205 may be embodied as one or more
other processing devices or circuitry. The term circuitry may
refer to an entirely hardware embodiment or a combination
of hardware and computer program products. Thus, the
processing element 205 may be embodied as integrated
circuits, application specific integrated circuits (ASICs),
field programmable gate arrays (FPGAs), programmable
logic arrays (PLAs), hardware accelerators, other circuitry,
and/or the like.

As will therefore be understood, the processing element
205 may be configured for a particular use or configured to
execute instructions stored in volatile or non-volatile media
or otherwise accessible to the processing element 205. As
such, whether configured by hardware or computer program
products, or by a combination thereof, the processing ele-
ment 205 may be capable of performing steps or operations
according to embodiments of the present invention when
configured accordingly.

In one embodiment, the predictive data analysis comput-
ing entity 106 may further include, or be in communication
with, non-volatile media (also referred to as non-volatile
storage, memory, memory storage, memory circuitry and/or
similar terms used herein interchangeably). In one embodi-
ment, the non-volatile storage or memory may include one
or more non-volatile storage or memory media 210, includ-
ing, but not limited to, hard disks, ROM, PROM, EPROM,
EEPROM, flash memory, MMCs, SD memory cards,
Memory Sticks, CBRAM, PRAM, FeRAM, NVRAM,
MRAM, RRAM, SONOS, FJG RAM, Millipede memory,
racetrack memory, and/or the like.

As will be recognized, the non-volatile storage or memory
media may store databases, database instances, database
management systems, data, applications, programs, program
modules, scripts, source code, object code, byte code, com-
piled code, interpreted code, machine code, executable
instructions, and/or the like. The term database, database
instance, database management system, and/or similar terms
used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention address technical problems related to efficiency and reliability of performing column classification by introducing machine-learning-based techniques for performing column classification that generate varied training data by modifying raw training columns in accordance with a variety of column augmentation techniques and/or sub-column sampling techniques. By utilizing these techniques, various embodiments of the present invention are able to utilize limited amounts of raw training data to generate a vast amount of derivative training data that not only enable more meaningful and predictively valuable training cycles, but also present varied textual configurations of the same types of columns to the column classification machine learning models during training processes, which in turn increases the robustness of the trained column classification machine learning models. In doing so, various embodiments of the present invention are able to reduce the need for retraining of column classification machine learning models and increase the reliability of trained column classification machine learning models in performing column classification. Accordingly, by introducing machine-learning-based techniques for performing column classification that generate varied training data by modifying raw training columns in accordance with a variety of column augmentation techniques and/or sub-column sampling techniques, various embodiments of the present invention address technical problems related to efficiency and reliability of performing column classification and make important technical contributions to the field of classification-based predictive data analysis.

A. Training a Column Classification Machine Learning Model Configured to Perform Column Classification FIG. 4 is a data flow diagram of an example process 400 for generating a column classification machine learning model. Via the various steps/operations of the process 400, the predictive data analysis computing entity 106 can generate a machine learning model that is able to efficiently and effectively generate predicted classifications for input columns.

The process 400 begins at step/operation 401 when the predictive data analysis computing entity 106 generates one or more training columns. In general, a column is a collection of values that are grouped together and collectively associated with a column. While an example of a column is a column of values in a relational table as part of a relational database, a person of ordinary skill in the relevant technology will recognize that other named groupings of values may functionally be equivalent to a relational table column and thus be subject to column classification techniques introduced by various embodiments of the present invention. In some embodiments, a column is associated with a value set, which includes each column value that is associated with the column as well as a column name. In some embodiments, a column that is associated with a ground-truth classification (e.g., a ground-truth classification describing whether a column includes sensitive information, such as patient health information (PHI) and/or patient identifying information (PII)) is referred to herein as a training column, as such a column may be utilized in accordance with one or more training algorithms to train a column classification machine learning model. In some embodiments, a column that is not associated with a ground-truth classification is referred to herein as an input column, as such a column may be processed by a trained column classification machine learning model to generate a predicted classification (e.g., a predicted classification describing whether a column includes sensitive information) for the input column.

In some embodiments, step/operation 401 may be performed in accordance with the process that is depicted in FIG. 5. The process depicted in FIG. 5 begins at step/operation 501 when the predictive data analysis computing entity 106 receives one or more raw training columns, where each raw training column is associated with a ground-truth classification. A ground-truth classification may describe an observed determination about whether a corresponding training column includes sensitive information, where the observed determination may be determined based on manual labeling of the raw training input and/or based on data about historical desensitizing operations (e.g., data masking operations, data anonymization operations, and/or the like) performed with respect to the corresponding training column. As discussed below, the ground-truth classification may be utilized to provide ground-truth data that may be used by one or more training algorithms to train a column classification machine learning model. In some embodiments, the predictive data analysis computing entity 106 receives the one or more raw training columns from one or more existing data sources, such as from at least one of one or more data reporting platforms, one or more healthcare data platforms, one or more customer service data platforms, one or more web-based data platforms, and one or more data processing applications (e.g., via one or more application programming interfaces (APIs) of the one or more data processing applications).

At step/operation 502, the predictive data analysis computing entity 106 generates a plurality of shuffled training columns based on the one or more raw training columns. In general, a shuffled column is a column that is generated by performing a shuffling (e.g., a randomized shuffling) of one or more column values of a source column, where the shuffled column may have the same column name as the source column and, if the source column is a training column that is associated with a ground-truth classification, the shuffled column may be associated with the same ground-truth classification as the source column. For example, given a source column that includes the ordered column value set {A, B, C}, is associated with the column name and is associated with the ground-truth classification $G_1$, examples of shuffled columns generated by performing shuffling of the one or more values of the noted source column include: a shuffled column that includes the ordered set of values {A, C, B}, is associated with the column name $N_1$, and is associated with the ground-truth classification $G_1$; a shuffled column that includes the ordered set of values {B, C, A}, is associated with the column name $N_1$, and is associated with the ground-truth classification $G_1$; a shuffled column that includes the ordered set of values {C, B, A}, is associated with the column name $N_1$, and is associated with the ground-truth classification $G_1$; a shuffled column that includes the ordered set of values {B, A, C}, is associated with the column name $N_1$, and is associated with the ground-truth classification $G_1$; and/or the like. In some embodiments, to generate the plurality of shuffled training columns, the predictive data analysis computing entity 106 generates a set of $h_1$ shuffled columns based on each raw training column, where $h_1$ may be a hyper-parameter of the predictive data analysis computing entity 106.

At step/operation 503, the predictive data analysis computing entity 106 generates a plurality of null-inserted training columns based on the plurality of shuffled training columns. While various embodiments of the present invention discuss performing column augmentation using column value shuffling followed by null insertion, a person of ordinary skill in the relevant technology will recognize that column augmentation may be performed by performing null value insertion followed by column value shuffling, by performing only null value insertion and column value shuffling, or without performing any of the null value insertion and the column value shuffling.

In general, a null-inserted column may be a column that is generated by converting a defined subset of column values of a source column into null values, where the null-inserted column may have the same column name as the source column and, if the source column is a training column that is associated with a ground-truth classification, the null-inserted column may be associated with the same ground-truth classification as the source column. In some embodiments, a null-inserted column may be generated by converting a particular ratio (e.g., five percent) of the column values of a source column into null values, where identifying the particular ratio of the column values of a source column may be performed using a random selection process. For example, given a source column that includes the ordered column value set {A, B, C, D}, is associated with the column name $N_1$, and is associated with the ground-truth classification $G_1$, and further given a 25 percent null value insertion ratio, examples of null-inserted columns generated by performing null value insertion based on the noted source column include: a null-inserted column that includes the ordered set of values {A, B, C, NULL}, is associated with the column name $N_1$, and is associated with the ground-truth classification $G_1$; a null-inserted column that includes the ordered set of values {A, B, NULL, D}, is associated with the column name $N_1$, and is associated with the ground-truth classification $G_1$; a null-inserted column that includes the ordered set of values {A, NULL, C, D}, is associated with the column name $N_1$, and is associated with the ground-truth classification $G_1$; and a null-inserted column that includes the ordered set of values {NULL, B, C, D}, is associated with the column name $N_1$, and is associated with the ground-truth classification $G_1$. In some embodiments, to generate the plurality of null-inserted training columns, the predictive data analysis computing entity 106 generates a set of $h_2$ null-inserted columns based on each shuffled training column, where $h_2$ may be a hyper-parameter of the predictive data analysis computing entity 106.

At step/operation 504, the predictive data analysis computing entity 106 generates the one or more training columns based on the plurality of null-inserted columns. In some embodiments, the predictive data analysis computing entity 106 adopts the plurality of null-inserted columns as the training columns. In some embodiments, the predictive data analysis computing entity 106 performs one or more additional column augmentation operations on the plurality of null-inserted columns into generate the training columns. In some embodiments, only the plurality of columns generated by column shuffling and randomization can be directly used to generate the training data. Similarly, the raw column values can be directly used to generate training data without any data augmentation (shuffling and null value insertion)

Returning to FIG. 4, at step/operation 402, the predictive data analysis computing entity 106 generates a set of defined-size sample sequences based on each training column. In general, a defined-size sample sequence may include a subset of a corresponding column that is generated by selecting a subset of the column values of the corresponding column that has a defined size, where the selection of the subset of column values of the corresponding column may be performed using a random selection process, and where the defined size of the subset may be determined using a sample size value that is selected from a sample size range. In some embodiments, to generate the set of defined-size sample sequences from a particular training column, the predictive data analysis computing entity 106 may select n sequences of a size defined by each sample size value r from each training column, where the value of r may be defined by a sample size range of R that defines one or more sample size values, such as a range of sample size values.

For example, in an exemplary embodiments in, which n=1 and R={1, 2, 3, 4, 5, 6, 7, 8, 9, 10}, the predictive data analysis computing entity 106 may generate a set of defined-size sample sequences for each training column that includes the following defined-size sample sequences: a defined-size sample sequence that includes one sequence of size one that is selected from the training column, a defined-size sample sequence that includes one sequence of size two that is selected from the training column, a defined-size sample sequence that includes one sequence of size three that is selected from the training column, a defined-size sample sequence that includes one sequence of size four that is selected from the training column, a defined-size sample sequence that includes one sequence of size five that is selected from the training column, a defined-size sample sequence that includes one sequence of six one that is selected from the training column, a defined-size sample sequence that includes one sequence of size seven that is selected from the training column, a defined-size sample sequence that includes one sequence of size eight that is selected from the training column, a defined-size sample sequence that includes one sequence of size nine that is selected from the training column, and a defined-size sample sequence that includes one sequence of size ten that is selected from the training column.

As another example, in an exemplary embodiments in, which n=5 and R={1, 2, 3, 4, 5, 6, 7, 8, 9, 10}, the predictive data analysis computing entity 106 may generate a set of defined-size sample sequences for each training column that includes the following defined-size sample sequences: a defined-size sample sequence that includes five sequences of size one that is selected from the training column, a defined-size sample sequence that includes five sequences of size two that is selected from the training column, a defined-size sample sequence that includes five sequences of size three that is selected from the training column, a defined-size sample sequence that includes five sequences of size four that is selected from the training column, a defined-size sample sequence that includes five sequences of size five that is selected from the training column, a defined-size sample sequence that includes five sequences of six one that is selected from the training column, a defined-size sample sequence that includes five sequences of size seven that is selected from the training column, a defined-size sample sequence that includes five sequences of size eight that is selected from the training column, a defined-size sample sequence that includes five sequences of size nine that is selected from the training column, and a defined-size sample sequence that includes five sequences of size ten that is selected from the training column.

In some embodiments, defined-size sample sequences are generated by selecting a unique subset of the column values of the corresponding column that has a defined size, where the selection of the subset of column values of the corresponding column may be performed using a random selection process, and where the defined size of the subset may be determined using a sample size value that is selected value a sample size range. For example, given a training column that consists of the three values {M, U, F}, n=2, and R={1, 2, 3, 4, 5, 6, 7, 8, 9, 10}, the predictive data analysis computing entity 106 may generate a set of defined-size sample sequences for each training column that includes the following defined-size sample sequences: a defined-size sample sequence that includes two sequences of size one that is selected from the training column, a defined-size sample sequence that includes two sequences of size two that is selected from the training column where each sequence includes two unique values (e.g., {M, F} and {M, U}), and a defined-size sample sequence that includes two sequences of size three that is selected from the training column where each sequence includes three unique values (e.g., {M, F, U} and {M, U, F}). Here, because each sequence must include unique values, despite the fact that R={1, 2, 3, 4, 5, 6, 7, 8, 9, 10}, sampling stops at n=3.

In some embodiments, to generate defined-size sample sequences in accordance with the prior paragraph, the predictive data analysis computing entity 106: (i) identifies the unique values in the column, and (ii) for each r value in R, selects r-sized values from the identified unique values with replacement. For example, with respect to a column representing gender of particular members, the unique values may be {Male, Female, Unknown}, and given R={1, 2, 3, 4, 5, 6, 7, 8, 9, 10}: (i) for n=1, the possible samples are {M}, {F}, {U}; (ii) for n=2, the possible samples are {M,F}, {M,U}, and so on; (iii) for n=3, the possible samples are {M,F,U}, {M,U,F}, and so on; and (iv) since maximum size of the unique subset is 3, the sampling will stop at n=3. As another example, with respect to a column representing names of particular members, there may be unique values such as for example {Sourav, Ravi, Sudeep, . . . }. Here, given R={1, 2, 3, 4, 5, 6, 7, 8, 9, 10}: (i) for n=1, sampling can continue until n=10 and does not have to stop because the count of unique values in the set of column values is less than ten.

An operational example of generating a set of defined-size sample sequences 602 for a training column 601 is depicted in FIG. 6. As depicted in FIG. 6, the set of defined-size sample sequences include one sequence of size one, one sequence of size two, and one sequence of size three. Accordingly, the set of defined-size sample sequences 602 of FIG. 6 are generated using a sample sequence generation technique that is characterized by the following operational parameters: a per-sample-size-value selection count parameter (n) of one and a sample size range (R) that equals {1, 2, 3}. In some embodiments, at least one of n and R may be defined by one or more hyper-parameters of the predictive data analysis computing entity 106.

Returning to FIG. 4, at step/operation 403, the predictive data analysis computing entity 106 generates a set of permutated sample sequences for each training column based on the set of defined-size sample sequences for the training column. In general, a permutated sequence describes a sequence of values (e.g., a sequence of column values) that is generated by changing an initial ordering of the sequence of values, where the order modification may be performed using a random modification process. For example, given a defined-size sample sequence that includes the ordered list of values {A, B, C, D}, examples of permutated sample sequences that may be generated based on the defined-size sample sequence include: a permutated sample sequence that includes the ordered list of values {A, C, B, D}, a permutated sample sequence that includes the ordered list of values {A, D, B, C}, a permutated sample sequence that includes the ordered list of values {A, C, D, B}, a permutated sample sequence that includes the ordered list of values {C, A, B, D}, a permutated sample sequence that includes the ordered list of values {A, C, B, D}, and a permutated sample sequence that includes the ordered list of values {D, C, B, A}. In some embodiments, each defined-size sample sequence is used to generate m permutated sample sequences, where m may be a hyper-parameter of the predictive data analysis computing entity 106. In some embodiments, given a defined-size sample sequence of size s, the m value for the noted defined-size sample sequence may be s!, meaning that the predictive data analysis computing entity 106 captures all of the possible permutations of the noted defined-size sample sequence as part of the set of permutated sample sequences that are associated with the training column that is used to generate the noted defined-size sample sequence.

At step/operation 404, the predictive data analysis computing entity 106 trains the column classification machine learning model using each set of permutated sample sequences that was generated in step/operation 403. In some embodiments, the predictive data analysis computing entity 106 associates each permutated sample sequence with the column name of the column used to generate the defined-size sample sequence associated with the permutated sample sequence and/or the ground-truth classification of the column used to generate the defined-size sample sequence associated with the permutated sample sequence. In some of the noted embodiments, the predictive data analysis computing entity 106 uses the ground-truth classifications of the permutated sample sequences that were generated in step/ operation 402 in order to generate deviation measures that can in turn be used to set parameters of the column classification machine learning model.

In general, a column classification machine learning model may be a machine learning model that is configured to process a vectorized representation of column values of an input column in order to generate a predicted classification for the input column. In some embodiments, in addition to using the vectorized representation of the column values of the input column, the column classification machine learning model additionally uses a vectorized representation of the column name of the input column in order to generate the predicted classification for the input column. In some embodiments, the column classification machine learning model includes at least two components: a name-based component (also referred to herein as a name-based column classification machine learning model) and a non-name-based component (also referred to herein as a non-name-based classification machine learning model), where the name-based component of the column classification machine learning model may be configured to process both the vectorized representation of the column values of an input column and the vectorized representation of the column names of the input column in order to generate a name-based predicted classification for the input column, and further where the non-name-based component of the column classification machine learning model may be configured to process the vectorized representation of the column values of an input column but not the vectorized representation of the column names of the input column in order to generate a non-name-based predicted classification for the input column.

In some embodiments, step/operation 404 may be performed with respect to a particular permutated sample sequence in accordance with the process depicted in FIG. 7. The process depicted in FIG. 7 begins at step/operation 701 when the predictive data analysis computing entity 106 generates a vectorized representation of the permutated sample sequence. In some embodiments, to generate the vectorized representation of the permutated sample sequence, the predictive data analysis computing entity 106 maps each inferred character of one or more inferred characters of the permutated sample sequence to a numerical representation of the inferred character, where the inferred characters may include alphanumeric characters and a value separator character (e.g., a new row character) that separates various column values of the permutated sample sequence from each other. In some embodiments, the value separator inferred character is assigned a numerical representation that substantially deviates from a distribution of numerical representations assigned to alphanumeric characters (e.g., is substantially larger than a distribution of the numerical representations assigned to alphanumeric characters), a feature that is configured at least in part to show that separation between various column values is numerically pronounced in vectorized representations used to train the column classification machine learning models.

An operational example of generating a vectorized representation 802 of a permutated sample sequence 801 is depicted in FIG. 8. As depicted in FIG. 8, the first letter of the vectorized representation 802 includes the alphanumeric representation of the first inferred character of the permutated sample sequence 801, which is a; the second letter of the vectorized representation 802 includes the alphanumeric representation of the second inferred character of the permutated sample sequence 801, which is b; the third letter of the vectorized representation 802 includes the alphanumeric representation of the third inferred character of the permutated sample sequence 801, which is c; the fourth letter of the vectorized representation 802 includes the numeric representation of the fourth inferred character of the permutated sample sequence 801, which is the separator inferred character; the fifth letter of the vectorized representation 802 includes the alphanumeric representation of the fifth inferred character of the permutated sample sequence 801, which is N; and so on.

Returning to FIG. 7, at step/operation 702, the predictive data analysis computing entity 106 processes the vectorized representation using the column classification machine learning model to generate an inferred classification for the permutated sample sequence. Aspects of processing a vectorized representation using various potential architectures of a column classification machine learning model are described in greater detail below with reference to step/operation 903 of FIG. 9.

An inferred classification may describe an inferred probability that a corresponding input data object (e.g., a corresponding permutated sample sequence) belongs to a target classification (e.g., a sensitive information classification, such as a PHI classification or a PII classification), where the inferred probability is determined during the training of a column classification machine learning model based on a then-existing state of the parameters and/or the hyperparameters of the column classification machine learning model. As described below, an inferred classification for a corresponding input data object may be compared during the training process for training a column classification machine learning to the ground-truth classification for the corresponding input data object to generate a measure of deviation for the corresponding input data object, where the measure of deviation can then in turn be used to set optimal values for the parameters of the column classification machine learning model as part of the training process. For example, if a permutated sample sequence is associated with an affirmative ground-truth classification and an inferred classification of 0.9, the per-sequence measure of deviation for the permutated sample sequence may be $(1.0-0.9)^2=0.1^2=0.01$, which in turn may be used in conjunction with other measures of deviations for other permutated sample sequences determined based on training columns in order to define a measure of deviation (e.g., an error function or a utility function) that can be used to set parameters of the column classification machine learning model.

At step/operation 703, the predictive data analysis computing entity 106 generates a measure of deviation for the column classification machine learning model based on the inferred classification for the permutated sample sequence as well as the ground-truth classification for the permutated sample sequence. In some embodiments, given a training set that includes a group of permutated sample sequences determined based on an original group of training columns, in order to generate the measure of deviation, the predictive data analysis computing entity 106 generates a per-sequence measure of deviation for each permutated sample sequence in the group of permutated sample sequences based on a measure of difference between the inferred classification for the permutated sample sequence as well as the ground-truth classification for the permutated sample sequence. For example, if a permutated sample sequence is associated with an affirmative ground-truth classification and an inferred classification of 0.7, the per-sequence measure of deviation for the permutated sample sequence may be $(1.0-0.7)^2=0.3^2=0.09$. As another example, if a permutated sample sequence is associated with a negative ground-truth classification and an inferred classification of 0.2, the per-sequence measure of deviation for the permutated sample sequence may be $(0.0-0.2)^2=(-0.2)^2=0.04$. In some embodiments, after generating each per-sequence measure of deviation for a permutated sample sequence in the group of permutated sample sequences, the predictive data analysis computing entity 106 combines (e.g., sums up, aggregates, and/or the like) each noted per-sequence measure of deviation to generate the overall measure of deviation, which may be an error function or a utility function.

At step/operation 704, the predictive data analysis computing entity 106 sets parameters of the column classification machine learning model based on the measure of deviation for the column classification machine learning model. In some embodiments, the predictive data analysis computing entity 106 sets parameters of the column classification machine learning model in a manner that is configured to optimize the measure of deviation for the column classification machine learning model, where the noted optimization may be performed using one or more global optimization techniques and/or using one or more local optimization techniques, such as using a gradient-descent-based technique (e.g., using gradient descent with back-propagation).

For example, if the measure of deviation for the column classification machine learning model is an error function and/or a loss function, the predictive data analysis computing entity 106 may set the parameters of the column classification machine learning model in a manner that is configured to minimize the noted measure of deviation for the column classification machine learning model. As another example, if the measure of deviation for the column classification machine learning model is a utility function and/or a reward function, the predictive data analysis computing entity 106 may set the parameters of the column classification machine learning model in a manner that is configured to maximize the noted measure of deviation for the column classification machine learning model.

B. Performing Column Classification Using a Trained Column Classification Machine Learning Model FIG. 9 is a flowchart diagram of an example process 900 for performing column classification using a trained column classification machine learning model. Via the various steps/operations of the process 900, the predictive data analysis computing entity 106 can utilize a trained machine learning model to efficiently and effectively generate predicted classifications for input columns.

The process 900 begins at step/operation 901 when the predictive data analysis computing entity 106 receives an input column. In some embodiments, the predictive data analysis computing entity 106 receives the input column from one or more external computing entities 102. In some embodiments, the predictive data analysis computing entity 106 receives the input column from one or more existing data sources, such as from at least one of one or more data reporting platforms, one or more healthcare data platforms, one or more customer service data platforms, one or more web-based data platforms, and one or more data processing applications (e.g., via one or more application programming interfaces (APIs) of the one or more data processing applications).

As discussed above, a column is a collection of values that are grouped together and collectively associated with a column. While an example of a column is a column of values in a relational table as part of a relational database, a person of ordinary skill in the relevant technology will recognize that other named groupings of values may functionally be equivalent to a relational table column and thus be subject to column classification techniques introduced by various embodiments of the present invention. In some embodiments, a column is associated with a value set, which includes each column value that is associated with the column as well as a column name. In some embodiments, a column that is not associated with a ground-truth classification is referred to herein as an input column, as such a column may be processed by a trained column classification machine learning model to generate a predicted classification (e.g., a predicted classification describing whether a column includes sensitive information) for the input column.

At step/operation 902, the predictive data analysis computing entity 106 generates a vectorized representation of the input column. In some embodiments, to generate the vectorized representation of the input column, the predictive data analysis computing entity 106 maps each inferred character of one or more inferred characters of the input column to a numerical representation of the inferred character, where the inferred characters include a value separator character (e.g., a new row character) that separates various column values of the input column from each other. In some embodiments, the value separator inferred character is assigned a numerical representation that substantially deviates from a distribution of numerical representations assigned to alphanumeric characters (e.g., is substantially larger than a distribution of the numerical representations assigned to alphanumeric characters), a feature that is configured at least in part to show that separation between various column values is numerically pronounced in vectorized representations used to train the column classification machine learning models. In some embodiments, generating the tokenized representation of an input column may be performed in accordance with the techniques described above with reference to step/operation 701 of the process of FIG. 7 and/or in accordance with the techniques described with reference to the operational example of FIG. 8.

At step/operation 903, the predictive data analysis computing entity 106 processes the vectorized representation for the input column using the column classification machine learning model in order to generate the predicted classification for the input column. The manner of processing of the vectorized representations in order to generate the predicted classifications depends on the overall architecture of the column classification machine learning model. Exemplary architectures for the column classification machine learning model are described below.

As discussed above, the predictive data analysis computing entity 106 uses the trained column classification machine learning model to generate a predicted classification. A predicted classification may describe a predicted probability that a corresponding input data object (e.g., a corresponding input column) belongs to a target classification (e.g., a sensitive information classification, such as a PHI classification or a PII classification), where predicted probability is generated by processing the corresponding input data object using a trained column classification machine learning model. As discussed above, the predicted probability for a corresponding input data object may be determined based on one or more features of the corresponding input data object, where the features are determined in accordance with the architecture of the column classification machine learning model, which in turn defines an acceptable input format for the column classification machine learning model. For example, if the corresponding input data object is an input column, the input features of the input column may include the column value set associated with the input column and/or the column name string associated with the input column.

As further discussed above, a column classification machine learning model includes at least two components: a name-based component (also referred to herein as a name-based column classification machine learning model) and a non-name-based component (also referred to herein as a non-name-based classification machine learning model), where the name-based component of the column classification machine learning model may be configured to process both the vectorized representation of the column values of an input column and the vectorized representation of the column names of the input column in order to generate a name-based predicted classification for the input column, and further where the non-name-based component of the column classification machine learning model may be configured to process the vectorized representation of the column values of an input column but not the vectorized representation of the column names of the input column in order to generate a non-name-based predicted classification for the input column.

Accordingly, in one exemplary architecture, a column classification machine learning model may comprise only the name-based component without the non-name-based component. In this exemplary architecture, processing the vectorized representation for an input column includes processing both the vectorized representation and the column name for the input column using the name-based component of the column classification machine learning model in order to generate the name-based predicted classification and adopt the name-based predicted classification as the predicted classification for the input column.

An operational example of a column classification machine learning model 1000 that consists solely of a name-based component is depicted in FIG. 10. As depicted in FIG. 10, the column classification machine learning model 1000 processes the column value set 1001 for the input column using a character encoding layer 1002 (e.g., a layer configured to perform operations of the step/operation 902), followed by an embedding layer 1003, followed by a bidirectional long-short term memory (Bi-LSTM) layer 1004 in order to generate a column-value-based intermediate output. As further depicted in FIG. 10, the column classification machine learning model 1000 processes the column name 1011 for the input column using a column name vectorization layer 1012, followed by an embedding layer 1013, followed by a Bi-LSTM layer 1014 in order to generate a column-name-based intermediate output. As further depicted in FIG. 10, the column classification machine learning model 1000 processes the column-value-based intermediate output and the column-name-based intermediate output using a concatenation layer 1031, followed by a group of fully-connected dense layers 1032, and followed by a softmax layer 1033 in order to generate the name-based predicted classification.

In another exemplary architecture, a column classification machine learning model may comprise only the non-name-based component without the name-based component. In this exemplary architecture, processing the vectorized representation for an input column includes processing the vectorized representation for the input column using the non-name-based component of the column classification machine learning model in order to generate the non-name-based predicted classification and adopt the non-name-based predicted classification as the predicted classification for the input column.

An operational example of a column classification machine learning model 1100 that consists solely of a non-name-based component is depicted in FIG. 11. As depicted in FIG. 11, the column classification machine learning model 1100 processes the column value set 1101 for the input column using a character encoding layer 1102 (e.g., a layer configured to perform operations of the step/operation 902), followed by an embedding layer 1103, followed by a bidirectional long-short term memory (Bi-LSTM) layer 1104, followed by a group of fully-connected dense layers 1105, and followed by a softmax layer 1106 in order to generate the non-name-based predicted classification.

In yet another exemplary architecture, a column classification machine learning model may comprise a name-based component configured to generate a name-based predicted classification for the input column, a non-name-based component configured to generate a non-name-based predicted classification for the input column, and an ensemble component configured to merge (e.g., average, computed a weighted average of, and/or the like) the name-based predicted classification and the non-name-based predicted classification to generate the predicted classification for the input column. In this exemplary architecture, processing the vectorized representation for an input column includes processing the vectorized representation for the input column using the non-name-based component of the column classification machine learning model in order to generate the non-name-based predicted classification, processing both the vectorized representation and the column name for the input column using the name-based component of the column classification machine learning model in order to generate the name-based predicted classification, and merging (e.g., averaging) the name-based predicted classification and the non-name-based predicted classification using the ensemble component of the column classification machine learning model to generate the predicted classification for the input column.

In a further exemplary architecture, a column classification machine learning model may comprise a name-based component configured to generate a name-based predicted classification for the input column, a non-name-based component configured to generate a non-name-based predicted classification for the input column, and a column name validator machine learning model that is configured to determine whether input data corresponding to the input column should be processed using the name-based component or the non-name-based component. Various embodiments of column name validator machine learning models are described in greater detail below.

In some embodiments, the column name validator machine learning model is a machine learning model that is configured to generate a predicted validation classification for a column based on the column name for the column. In some embodiments, the column name validator machine learning model includes a dictionary of validated column names, where if the column name for a column corresponds to one of the entries in the dictionary, an affirmative predicted validation classification is determined for the column, while if the column name for a column fails to correspond to one of the entries in the dictionary, a negative predicted validation classification is determined for the column. In some embodiments, the column name validator machine learning model includes a trained classification model that is configured to trained to detect a predicted validation classification for a column based on a vectorized representation of the column name for the column.

In some embodiments, a predicted validation classification describes a conclusion about whether a column name of a corresponding column is deemed a valid/reliable column name. As described above, the predicted validation classification for a column may be determined using a dictionary-based column name validator machine learning model and/or a trained classification column name validator machine learning model. In some embodiments, when the predicted validation classification is determined using a dictionary-based column name validator machine learning model, the predicted validation classification describes whether the column name for a corresponding column corresponds to an entry in the dictionary associated with the dictionary-based column name validator machine learning model. In some embodiments, when the predicted validation classification is determined using a trained classification column name validator machine learning model, the predicted validation classification describes whether an inferred validation probability generated by the trained classification column name validator machine learning model via processing the column name for a corresponding column satisfies (e.g., exceeds) a defined inferred validation probability threshold, such as a defined inferred validation probability threshold of 0.5.

As discussed above, an example of a column validator machine learning model is a dictionary-based column name validator machine learning model. An operational example of a dictionary data object 1200 utilized by a dictionary-based column name validator machine learning model is depicted in FIG. 12. As depicted in FIG. 12, the dictionary data object 1200 describes naming variations for each sensitive column name category. For example, in accordance with the dictionary data object 1200 of FIG. 12, a corresponding dictionary-based column name validator machine learning model may determine that a column has an affirmative predicted validation classification if the column name for the column is one of the following: mbr_fst_nm, mem_nm, mbr_name, ssn, ssn_nbr, mbr_ssn, soc_sec_nbr, mbr_gdr, mem_gdr_typ, gdr_typ_cd, and mbr_gender.

As further discussed above, another example of a column name validator machine learning model is a trained classification column name validator machine learning model. In some embodiments, to train a classification column name validator machine learning model, all possible naming variations for all desired column name categories are collated to prepare the training data. In some embodiments, each acceptable naming variation is vectorized (e.g., using a term-frequency-inverse-domain-frequency (TF-IDF) based approach). These vectorized columns are used as the predictor variables for training entries that are associated with affirmative ground-truth validation classifications. The acceptable name variation strings are then randomized to create incomprehensible/gibberish names, which are used (e.g., vectorized) to generate training entries that are associated with negative ground-truth validation classifications. The combined set of affirmative training entries and the negative training entries are then used in accordance with a training algorithm (e.g., a gradient-descent-based training algorithm) to train a classification column name validator machine learning model.

Returning to FIG. 9, at step/operation 904, the predictive data analysis computing entity 106 performs one or more prediction-based actions based on the predicted classification. Examples of prediction-based actions that may be performed based on the predicted classification include data masking operations, data anonymization operations, generating a prediction output user interface that displays the prediction classification, generating one or more notifications based on the prediction classification, generation a prediction output user interface that displays a masked version of the input column, generating a prediction output user interface that displays an anonymized version of the input column, and/or the like. Various embodiments of performing the referenced data masking operations and the referenced data anonymization operations are described in greater detail below.

In some embodiments, in response to determining that the predicted classification describes an affirmative classification (e.g., a sensitive data classification, such as a PHI/PII classification), the predictive data analysis computing entity 106 generates a masked representation of the input column based on an inferred column value format for the input column. In some embodiments, to generate the masked representation of the input column, the predictive data analysis computing entity 106 infers an inferred column value format of each column value of the input column, where the inferred column value format of a column value describes one or more sub-values of the column value. In some embodiments, subsequent to inferring the inferred column value format of a column value that identifies one or more sub-values of the column value, the predictive data analysis computing entity 106 modifies the column value by converting a selected subset of the one or more sub-values into masked values (e.g., into X values), where determining the selected subset of the one or more sub-values may be performed in accordance with the configuration data associated with the predictive data analysis computing entity 106. For example, the predictive data analysis computing entity 106 may infer that a particular column value 12-08-1990 has the inferred column value format Day-Month-Year, receive configuration data requiring masking of day and month data, and thus generate the following masked representation for the particular column value XX-XX-1990.

In some embodiments, to determine the inferred column value format of a column value, the predictive data analysis computing entity 106 uses one or more regular expression conditions each associated with an inferred column value format, where if a column value matches the regular expression condition then the column value is deemed to have the inferred column value format that is associated with the regular expression condition. In some embodiments, the predictive data analysis computing entity 106 maintains (e.g., as part of the data stored by the predictive data analysis system 101) regular expression condition data that define a set of related regular expression conditions, such as a set of related regular expression conditions that include a subset of related regular expression conditions for each sensitive column name category (e.g., for each PHI/PII data category).

In some embodiments, to determine the inferred column value format of a column value, the predictive data analysis computing entity 106 uses a format inference machine learning model. The format inference machine learning model may be a trained machine learning model that is configured to process a vectorized representation of a column value in order to infer the inferred column value format of the column value. An operational example of a format inference machine learning model 1300 is depicted in FIG. 13. As depicted in FIG. 13, the format inference machine learning model processes a column value 1301 using a data standardization module 1302 that is configured to convert the column value 1301 into a standard form (e.g., into a lowercase form for string column values). As further depicted in FIG. 13, the output of the data standardization module 1302 is processed by a character encoding module 1303 that is configured to generate a vectorized representation of the output of the data standardization module 1302 (e.g., in accordance with the techniques described above with reference to step/operation 701 of the process of FIG. 7 and/or in accordance with the techniques described with reference to the operational example of FIG. 8).

As further depicted in FIG. 13, the output of the character encoding module 1303 is processed by a deep learning module 1304 in order to generate the inferred column value format 1305 for the column value 1301. In some embodiments, the deep learning module 1304 uses a trained deep learning model (e.g., a trained LSTM model, such as a trained Bi-LSTM model) to process the output of the character encoding module 1303 in order to generate the inferred column value format 1305 for the column value 1301. An operational example of a Bi-LSTM model 1400 that may be used to generate an inferred column value format of a respective column value is depicted in FIG. 14.

In some embodiments, in response to determining that the predicted classification describes an affirmative classification (e.g., a sensitive data classification, such as a PHI/PII classification), the predictive data analysis computing entity 106 generates a modified representation (e.g., an anonymized representation) of the input column by converting each column value associated with the input column to a modified column value. Different modification/anonymization techniques may be used to convert a column value into a modified column value. In some embodiments, strictly numeric column values such as social security number fields may be modified/anonymized using numeric randomization algorithms (e.g., an alias can be created by creating a completely unique yet random numeric string for a particular number). In some embodiments, date columns may be scaled to arbitrary timelines. This may be done by finding the maximum and minimum date for a table and/or for a particular column and using the maximum and minimum date to define scaling parameters to scale dates. For example, if date for a column is 14 Jul. 1930 and maximum date is current date 7 May 2020, the dates in the column may be scaled by adding five days to each date, which would for example modify the minimum date to 19 Jul. 1930 and the maximum date to 12 May 2020. In some embodiments, string based column values may be randomized or completely new arbitrary unique strings may be created as aliases for existing string column values.

C. Training a Column Classification Machine Learning Model Configured to Perform Anomaly Detection Detecting that a column value is anomalous when compared to other column values for the same column can be used to detect data errors, data leakage scenarios, and data theft scenarios. FIG. 15 is a flowchart diagram of a process 1500 for training a column classification machine learning model to perform anomaly detection. Via the various steps/operations of the process 1500, the predictive data analysis computing entity 106 can generate a machine learning model that is able to efficiently and effectively detect data anomalies.

The process 1500 begins at step/operation 1501 when the predictive data analysis computing entity 106 generates one or more training columns. In general, a column is a collection of values that are grouped together and collectively associated with a column. While an example of a column is a column of values in a relational table as part of a relational database, a person of ordinary skill in the relevant technology will recognize that other named groupings of values may functionally be equivalent to a relational table column and thus be subject to column classification techniques introduced by various embodiments of the present invention. In some embodiments, a column is associated with a value set, which includes each column value that is associated with the column as well as a column name. In some embodiments, a column that is associated with a ground-truth classification (e.g., a ground-truth classification describing whether a column includes sensitive information, such as patient health information (PHI) and/or patient identifying information (PII)) is referred to herein as a training column, as such a column may be utilized in accordance with one or more training algorithms to train a column classification machine learning model. In some embodiments, a column that is not associated with a ground-truth classification is referred to herein as an input column, as such a column may be processed by a trained column classification machine learning model to generate a predicted classification (e.g., a predicted classification describing whether a column includes sensitive information) for the input column. In some embodiments, generating the one or more training columns comprises performing one or more data augmentation operations, such as the data augmentation operations described in relation to process 500 of FIG. 5.

At step/operation 1502, the predictive data analysis computing entity 106 generates a plurality of size-one sample sequences based on each training column. To do so, the predictive data analysis computing entity 106 generates defined-size sample sequences based on each training column in accordance with the techniques described in relation to step/operation 402, but by setting the sample size range to R={1}. In some embodiments, performing step/operation 1502 includes selecting n of the column values of each training column individually, where n may be equal to the number of column values of a training column.

At step/operation 1503, the predictive data analysis computing entity 106 generates a vectorized representation of each size-one sample sequence, for example in accordance with the techniques described above with reference to step/operation 701 of the process of FIG. 7 and/or in accordance with the techniques described with reference to the operational example of FIG. 8. In some embodiments, to generate the vectorized representation of a size-one sample sequence, the predictive data analysis computing entity 106 maps each inferred character of one or more inferred characters of the size-one sample sequence to a numerical representation of the inferred character, where the inferred characters include a value separator character (e.g., a new row character) that separates various column values of the size-one sample sequence from each other. In some embodiments, the value separator inferred character is assigned a numerical representation that substantially deviates from a distribution of numerical representations assigned to alphanumeric characters (e.g., is substantially larger than a distribution of the numerical representations assigned to alphanumeric characters), a feature that is configured at least in part to show that separation between various column values is numerically pronounced in vectorized representations used to train the column classification machine learning models.

At step/operation 1504, the predictive data analysis computing entity 106 processes the vectorized representations of the size-one sample sequences using the column classification machine learning model to generate an inferred classification for each size-one sample sequence. In some embodiments, the column classification machine learning model trained using the process 1500 consists of a non-name-based component, as the column name may be deemed unrelated to detecting anomalous column values. Aspects of processing a vectorized representation using a column classification machine learning model are described in greater detail below with reference to step/operation 903 of FIG. 9.

As described above, an inferred classification may describe an inferred probability that a corresponding input data object (e.g., a corresponding size-one sample sequence) belongs to a target classification (e.g., a sensitive information classification, such as a PHI classification or a PII classification), where the inferred probability is determined during the training of a column classification machine learning model based on a then-existing state of the parameters and/or the hyper-parameters of the column classification machine learning model. As described below, an inferred classification for a corresponding input data object may be compared during the training process of a column classification machine learning to the ground-truth classification to generate a measure of deviation for the corresponding input data object, where the measure of deviation can then in turn be used to set optimal values for the parameters of the column classification machine learning model as part of the training process. For example, if a size-one sample sequence is associated with an affirmative ground-truth classification and an inferred classification of 0.9, the per-sequence measure of deviation for the size-one sample sequence may be $(1.0-0.9)^2=0.1^2=0.01$, which in turn may be used in conjunction with other measures of deviations for other size-one sample sequences determined based on training columns in order to define a measure of deviation (e.g., an error function or a utility function) that can be used to set parameters of the column classification machine learning model.

At step/operation 1505, the predictive data analysis computing entity 106 generates a measure of deviation for the column classification machine learning model based on each inferred classification for a size-one sample sequence as well as the ground-truth classification for the size-one sample sequence. In some embodiments, given a training set that includes a group of size-one sample sequences determined based on an original group of training columns, in order to generate the measure of deviation, the predictive data analysis computing entity 106 generates a per-sequence measure of deviation for each size-one sample sequence in the group of size-one sample sequences based on a measure of difference between the inferred classification for the size-one sample sequence as well as the ground-truth classification for the training column that was used to generate the size-one sample sequence.

For example, if a size-one sample sequence is associated with an affirmative ground-truth classification and an inferred classification of 0.7, the per-sequence measure of deviation for the size-one sample sequence may be $(1.0-0.7)^2=0.3^2=0.09$. As another example, if a size-one sample sequence is associated with a negative ground-truth classification and an inferred classification of 0.2, the per-sequence measure of deviation for the size-one sample sequence may be $(0.0-0.2)^2=(-0.2)^2=0.04$. In some embodiments, after generating each per-sequence measure of deviation for each size-one sample sequence in the group of size-one sample sequences, the predictive data analysis computing entity 106 combines (e.g., sums up) each per-sequence measure of deviation to generate the overall measure of deviation, which may be an error function or a utility function.

At step/operation 1506, the predictive data analysis computing entity 106 sets parameters of the column classification machine learning model based on the measure of deviation for the column classification machine learning model. In some embodiments, the predictive data analysis computing entity 106 sets parameters of the column classification machine learning model in a manner that is configured to optimize the measure of deviation for the column classification machine learning model, where the noted optimization may be performed using a global optimization technique or a local optimization technique such as using a gradient-descent-based technique (e.g., gradient descent with backpropagation).

For example, if the measure of deviation for the column classification machine learning model is an error function and/or a loss function, the predictive data analysis computing entity 106 may set the parameters of the column classification machine learning model in a manner that is configured to minimize the noted measure of deviation for the column classification machine learning model. As another example, if the measure of deviation for the column classification machine learning model is a utility function and/or a reward function, the predictive data analysis computing entity 106 may set the parameters of the column classification machine learning model in a manner that is configured to maximize the noted measure of deviation for the column classification machine learning model.

D. Performing Anomaly Detection Using a Trained Column Classification Machine Learning Model Once trained in accordance with the process 1500 of FIG. 15, a trained column classification machine learning model may be used to perform anomaly detection. In some embodiments, to perform anomaly detection on an input column using a trained column classification machine learning model, the predictive data analysis computing entity 106 performs the steps/operations of the process 1600 as depicted in FIG. 16. Via the various steps/operations of the process 1600, the predictive data analysis computing entity 106 can utilize a trained column classification machine learning model to effectively and efficiently perform anomaly detection.

The process 1600 begins at step/operation 1601 when the predictive data analysis computing entity 106 generates a per-value anomaly prediction for each column value of an input column. The per-value anomaly prediction describes a predicted conclusion about whether a corresponding column value is anomalous, where the predicted conclusion may be determined based on a relationship of a predicted classification for the corresponding column value and a distribution of all predicted classifications for all of the column values of the column that includes the corresponding column value.

In some embodiments, to generate the per-value anomaly prediction for a particular input column value of a particular input column, the predictive data analysis computing entity 106 processes the input column vector for the input column value (e.g., generated in accordance with the techniques described above with reference to step/operation 701 of the process of FIG. 7 and/or in accordance with the techniques described with reference to the operational example of FIG. 8) using the trained column classification machine learning model to generate a predicted classification for the input column value. Thereafter, the predictive data analysis computing entity 106 determines a measure of distance between the predicted classification for the input column value and a per-column probability distribution measure for each predicted classification that is associated with an input column value for the input column (e.g., a mean of all predicted classifications associated with the input column values of the input column, a median of all predicted classifications associated with the input column values of the input column, a mode of all predicted classifications associated with the input column values of the input column, a variance of all predicted classifications associated with the input column values of the input column, a standard deviation of all predicted classifications associated with the input column values of the input column, and/or the like). Afterward, the predictive data analysis computing entity 106 determines the per-value anomaly prediction based on the measure of deviation, e.g., based on whether the measure of deviation fails to satisfy (e.g., fails to exceed) a deviation measure threshold. For example, a determination that the measure of deviation for a particular input column value fails to satisfy a deviation measure threshold may lead to a negative per-value anomaly prediction, while a determination that the measure of deviation for a particular input column value satisfies a deviation measure threshold may lead to a positive per-value anomaly prediction.

At step/operation 1602, the predictive data analysis computing entity 106 combines each per-value anomaly prediction for an input column value of the input column to determine a per-column anomaly prediction that describes whether the input column includes at least one anomalous column value. Therefore, in some embodiments, the predictive data analysis computing entity 106 determines that an input column is anomalous if at least one input column value associated with the input column is associated with an affirmative per-value anomaly prediction. Examples of per-value anomaly predictions include data leakage predictions, data error predictions, data fraud predictions, data theft predictions, and/or the like.

At step/operation 1603, the predictive data analysis computing entity 106 performs one or more prediction-based actions based on the per-column anomaly detection for the input column. Examples of prediction-based actions include generating a prediction output user interface that describes the per-column anomaly detection for the input column, generating a prediction output user interface that describes a type (e.g., a data leakage type, a data fraud type, a data theft type, a data error type, and/or the like) of an affirmative per-column anomaly detection for the input column, generating one or more security alerts based on an affirmative per-column anomaly detection for the input column, blocking non-administrative access to the input column based on an affirmative per-column anomaly detection for the input column, and/or the like.

In some embodiments, in addition to or instead of generating a per-column anomaly prediction, the predictive data analysis computing entity 106 determines a per-column error prediction for the input column. In some of the noted embodiments, the predictive data analysis computing entity 106 performs the following operations: for each input column value of a plurality of input column values: determining a per-value classification for the input column value based on the predicted classification for the input column value, and determining a per-value error prediction for the input column value based on the per-value classification for the input column value and a per-column classification for the input column that is determined based on the plurality of predicted classifications; and determining a per-column error prediction for the input column based on each per-value error prediction for an input column value of the plurality of input column values, wherein the per-column error prediction is used to perform one or more prediction-based actions.

For example, if a column deemed to include sensitive information has one or more column values that are deemed to be non-sensitive, each per-value error prediction for a column value of the one or more column values is deemed to describe an affirmative per-value error prediction, and the per-column error prediction for the column is deemed to also have an affirmative per-column error prediction. As another example, if a column deemed to include non-sensitive information has one or more column values that are deemed to be sensitive, each per-value error prediction for a column value of the one or more column values is deemed to describe an affirmative per-value error prediction, and the per-column error prediction for the column is deemed to also have an affirmative per-column error prediction.

For example, as depicted in the operational example of FIG. 17, the column value 1701 and 1702 are determined to have an affirmative per-column error prediction as their per-value classification differs from the per-column classification of the corresponding column. As further depicted in FIG. 17, because the corresponding column includes at least one per-column error prediction with an affirmative per-value error prediction, the column as a whole is also deemed to have an affirmative per-column error prediction.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors, a training column and a ground-truth classification for the training column;

inputting, by the one or more processors, a plurality of permutated sample sequences that is sampled from the training column to a machine learning model to receive a plurality of inferred sequence classifications for the received ground-truth classification for the training column, wherein:

(i) the training column is a portion of a limited training dataset for the machine learning model and the plurality of permutated sample sequences is a portion of a derivative training dataset that is derived from the training column of the limited training dataset and in which each of the plurality of permutated sample sequences is assigned the received ground-truth classification for the training column to derive additional training samples from the training column and the received ground-truth classification for the training column, (ii) the plurality of permutated sample sequences comprises a plurality of permutations of a plurality of defined-size sample sequences from the training column, and (iii) a defined-size sample sequence of the plurality of defined-size sample sequences comprises a subset of a plurality of column values within the training column with a defined size that corresponds to a sample size value selected from a plurality of sample size values defined by a sample size range hyperparameter, wherein the defined size defines a number of the subset of the plurality of column values within the defined-size sample sequence; and training, by the one or more processors, the machine learning model based on an aggregated deviation between each of the plurality of inferred sequence classifications and only the received ground-truth classification of the training column without receiving additional ground-truth classifications for each of the plurality of inferred sequence classifications.

2. The computer-implemented method of claim 1, wherein the plurality of defined-size sample sequences comprises a respective defined-size sample sequence for each of the plurality of sample size values defined by the sample size range hyperparameter.

3. The computer-implemented method of claim 1, wherein the training column is a null-inserted training column that is based on a permutated training column from a raw training column.

4. The computer-implemented method of claim 1, further comprising:

inputting a plurality of vectorized representations of the plurality of permutated sample sequences to the machine learning model to receive the plurality of inferred sequence classifications based on the plurality of vectorized representations.

5. The computer-implemented method of claim 4, wherein the plurality of inferred sequence classifications is based on the plurality of vectorized representations and a column name for the training column.

6. The computer-implemented method of claim 5, wherein the machine learning model comprises a first classification model, a second classification model, and a concatenation layer and receiving the plurality of inferred sequence classifications further comprises:

inputting the plurality of vectorized representations to the first classification model of the machine learning model to receive a plurality of first inferred sequence predictions based on the plurality of vectorized representations;

inputting the plurality of vectorized representations and the column name to the second classification model of the machine learning model to receive a plurality of second inferred sequence predictions based on the plurality of vectorized representations and the column name; and inputting the plurality of first inferred sequence predictions and the plurality of second inferred sequence predictions to the concatenation layer to receive the plurality of inferred sequence classifications.

7. A system comprising memory and one or more processors communicatively coupled to the memory, the one or more processors configured to:

receive a training column and a ground-truth classification for the training column;

input a plurality of permutated sample sequences that is sampled from the training column to a machine learning model to receive a plurality of inferred sequence classifications for the received ground-truth classification for the training column, wherein:

(i) the training column is a portion of a limited training dataset for the machine learning model and the plurality of permutated sample sequences is a portion of a derivative training dataset that is derived from the training column of the limited training dataset and in which each permutated sample sequence is assigned the received ground-truth classification for the training column to derive additional training samples from the training column and the received ground-truth classification for the training column, (ii) the plurality of permutated sample sequences comprises a plurality of permutations of a plurality of defined-size sample sequences from the training column, and (iii) a defined-size sample sequence of the plurality of defined-size sample sequences comprises a subset of a plurality of column values within the training column with a defined size that corresponds to a sample size value selected from a plurality of sample size values defined by a sample size range hyperparameter, wherein the defined size defines a number of the subset of the plurality of column values within the defined-size sample sequence; and train the machine learning model based on an aggregated deviation between each of the plurality of inferred sequence classifications and only the received ground-truth classification of the training column without receiving additional ground-truth classifications for each of the plurality of inferred sequence classifications.

8. The system of claim 7, wherein the training column is a null-inserted training column that is based on a permutated training column from a raw training column.

9. The system of claim 7, wherein the one or more processors are further configured to:

inputting a plurality of vectorized representations of the plurality of permutated sample sequences to the machine learning model to receive the plurality of inferred sequence classifications based on the plurality of vectorized representations.

10. The system of claim 9, wherein the plurality of inferred sequence classifications is based on the plurality of vectorized representations and a column name for the training column.

11. The system of claim 10, wherein the machine learning model comprises a first classification model, a second classification model, and a concatenation layer and receiving the plurality of inferred sequence classifications comprises:

inputting the plurality of vectorized representations to the first classification model of the machine learning model to receive a plurality of first inferred sequence predictions based on the plurality of vectorized representations;

inputting the plurality of vectorized representations and the column name to the second classification model of the machine learning model to receive a plurality of second inferred sequence predictions based on the plurality of vectorized representations and the column name; and inputting the plurality of first inferred sequence predictions and the plurality of second inferred sequence predictions to the concatenation layer to receive the plurality of inferred sequence classifications.

12. One or more non-transitory computer-readable storage media including instructions that, when executed by one or more processors, cause the one or more processors to:

receive a training column and a ground-truth classification for the training column;

input a plurality of permutated sample sequences that is sampled from the training column to a machine learning model to receive a plurality of inferred sequence classifications for a single the received ground-truth classification for the training column, wherein:

(i) the training column is a portion of a limited training dataset for the machine learning model and the plurality of permutated sample sequences is a portion of a derivative training dataset that is derived from the training column of the limited training dataset and in which each permutated sample sequence is assigned the received ground-truth classification for the training column to derive additional training samples from the training column and the received ground-truth classification for the training column, (ii) the plurality of permutated sample sequences comprises a plurality of permutations of a plurality of defined-size sample sequences from the training column, and (iii) a defined-size sample sequence of the plurality of defined-size sample sequences comprises a subset of a plurality of column values within the training column with a defined size that corresponds to a sample size value selected from a plurality of sample size values defined by a sample size range hyperparameter, wherein the defined size defines a number of the subset of the plurality of column values within the defined-size sample sequence; and train the machine learning model based on an aggregated deviation between each of the plurality of inferred sequence classifications and only the received ground-truth classification of the training column without receiving additional ground-truth classifications for each of the plurality of inferred sequence classifications.

13. The one or more non-transitory computer-readable storage media of claim 12, wherein the plurality of inferred sequence classifications is based on a column name for the training column.

14. The one or more non-transitory computer-readable storage media of claim 13, wherein the machine learning model comprises a first classification model, a second classification model, and a concatenation layer and receiving the plurality of inferred sequence classifications further comprises:

inputting a plurality of vectorized representations to the first classification model of the machine learning model to receive a plurality of first inferred sequence predictions based on the plurality of vectorized representations;

inputting the plurality of vectorized representations and the column name to the second classification model of the machine learning model to receive a plurality of second inferred sequence predictions based on the plurality of vectorized representations and the column name; and inputting the plurality of first inferred sequence predictions and the plurality of second inferred sequence predictions to the concatenation layer to receive the plurality of inferred sequence classifications.

15. The computer-implemented method of claim 6, wherein the first classification model is a first neural network, the second classification model is a second neural network, and the first neural network and the second neural network are trained using gradient descent with backpropagation.

* * * * *